(12) United States Patent
Belleschi et al.

(10) Patent No.: US 12,096,431 B2
(45) Date of Patent: Sep. 17, 2024

(54) SIDELINK CONFIGURATION TECHNIQUE

(71) Applicant: Telefonaktiebolaget LM Ericsson (publ), Stockholm (SE)

(72) Inventors: Marco Belleschi, Solna (SE); Mattias Bergström, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 468 days.

(21) Appl. No.: 17/426,697

(22) PCT Filed: Feb. 14, 2020

(86) PCT No.: PCT/EP2020/053829
§ 371 (c)(1),
(2) Date: Jul. 29, 2021

(87) PCT Pub. No.: WO2020/165381
PCT Pub. Date: Aug. 20, 2020

(65) Prior Publication Data
US 2022/0110105 A1    Apr. 7, 2022

Related U.S. Application Data

(60) Provisional application No. 62/805,395, filed on Feb. 14, 2019.

(51) Int. Cl.
*H04W 4/00* (2018.01)
*H04W 72/20* (2023.01)
*H04W 76/14* (2018.01)

(52) U.S. Cl.
CPC .......... *H04W 72/20* (2023.01); *H04W 76/14* (2018.02)

(58) Field of Classification Search
CPC ...... H04W 72/20; H04W 76/14; H04W 72/23
USPC .................................................. 370/329, 330
See application file for complete search history.

(56) References Cited

U.S. PATENT DOCUMENTS

| | | | |
|---|---|---|---|
| 2017/0079016 A1* | 3/2017 | Nord | H04W 72/54 |
| 2018/0049259 A1 | 2/2018 | Aminaka et al. | |
| 2019/0007812 A1* | 1/2019 | Shilov | H04W 4/06 |
| 2019/0281596 A1* | 9/2019 | Adachi | H04W 72/04 |

(Continued)

OTHER PUBLICATIONS

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 v15.4.0, pp. 1-363, Sophia-Antipolis, Cedex, France, XP051686899.

*Primary Examiner* — Chuong T Ho
(74) *Attorney, Agent, or Firm* — Weisberg I.P. Law, P.A.

(57) ABSTRACT

A technique for distributing, receiving and transmitting a radio configuration for sidelink, SL, communications (502) that extend beyond an area (604) covered by one or more base stations (504) is described. As to one method aspect of the technique, a method of distributing the radio configuration for SL communications (502) comprises or initiates a step of receiving (302) the radio configuration for the SL communications (502) from at least one of the one or more base stations (504) and local memory. The method further comprises or initiates a step of transmitting (304) at least one message in the SL communications (502), which is indicative of at least a subset of the radio configuration and a geographical and/or temporal limitation (602) thereof.

18 Claims, 9 Drawing Sheets

(56) References Cited

U.S. PATENT DOCUMENTS

| | | | | |
|---|---|---|---|---|
| 2019/0394786 A1* | 12/2019 | Parron | ............... | H04L 5/0032 |
| 2020/0092685 A1* | 3/2020 | Fehrenbach | ........ | H04W 84/047 |
| 2021/0227364 A1* | 7/2021 | Muehleisen | ............ | H04W 4/46 |
| 2021/0251023 A1* | 8/2021 | Phan | ....................... | H04W 4/70 |
| 2022/0039080 A1* | 2/2022 | Khoryaev | ............... | H04W 4/40 |
| 2023/0370152 A1* | 11/2023 | Wang | ................... | H04L 5/0048 |

* cited by examiner

100

200

800

900

SIDELINK CONFIGURATION TECHNIQUE

TECHNICAL FIELD

The present disclosure relates to a radio configuration for sidelink communications. More specifically, and without limitation, methods and devices for distributing, receiving and/or transmitting a radio configuration for sidelink communications are provided.

BACKGROUND

Since release 12 of Long Term Evolution (LTE), the Third Generation Partnership Project (3GPP) has specified support and features for device-to-device (D2D) communications, which are also referred to as sidelink (SL) communications. More specifically, features targeting both commercial and public safety applications have been specified. For example, radio devices (also referred to as user equipments, UEs) can perform device discovery, i.e., a radio device is able to sense the proximity of another radio device and an associated application by broadcasting and detecting discovery messages that carry an identifier for the radio device and an identifier application. Another example of SL communications uses direct communications based on physical channels terminated directly between the radio devices. In 3GPP, all of these features for SL communications are defined under the umbrella of Proximity Services (ProSe).

Using the same set of radio resources for SL communications in an area that is greater than the area covered by a base station is beneficial, because independent of whether individual radio devices involved in the SL communications are in or out of base station coverage, the SL radio resources are dedicated for the SL communications, which improves the performances of the SL communications.

However, the SL communications may span several cells or several geographical areas. Therefore, if radio devices involved in the same SL communications are under different network coverage, e.g. camping on or connected to different cells or located in different geographical areas, the common set of SL radio resources for the SL communications can interfere with another set of SL, uplink or downlink radio resources allocated by the neighboring cell or the neighboring geographical area.

SUMMARY

Accordingly, there is a need for a technique that reduces or avoids interference caused by sidelink communications.

As to a first method aspect, a method of distributing a radio configuration for sidelink (SL) communications that extend beyond an area covered by one or more base stations is provided. The method comprises or initiates a step of receiving the radio configuration for the SL communications from at least one of the one or more base stations and local memory. The method further comprises or initiates a step of transmitting at least one message in the SL communications. The at least one message is indicative of at least a subset of the radio configuration and a geographical and/or temporal limitation thereof.

By transmitting in the SL communications at least the subset of the radio configuration received from the base station and/or the local memory, at least some embodiments can forward at least the subset of the radio configuration to another radio device involved or participating in the SL communications. By further transmitting in the SL communications the geographical and/or temporal limitation of at least the subset of the radio configuration, same or further embodiments can reduce or avoid interference between at least the subset of the radio configuration and another radio configuration, e.g., applicable outside of the geographical and/or temporal limitation.

The radio configuration for the SL communications may be received from at least one of the one or more base stations, or from the local memory (e.g., obtained from the local memory), or from both. For example, the radio configuration may be a combination of a basic setting predefined in the local memory and an update received from one of the one or more base stations.

The at least one message may be indicative of at least a subset of the radio configuration. That is, the message may be indicative of the radio configuration or a subset thereof. Herein, "at least the subset of the radio configuration" may encompass the radio configuration (e.g., completely or to the extent received from the base station) or the (e.g., proper) subset of the radio configuration.

The at least one message may further be indicative of a geographical and/or temporal limitation for at least the subset of the radio configuration. For example, the at least one message may be further indicative of a geographical area. An application or usage of at least the subset of the radio configuration may be limited or restricted to the geographical area. The geographical limitation may also be referred to as a spatial limitation of the radio configuration.

The first method aspect may be performed at or by a configuration-distributing radio device, which may also be referred to as reference radio device. The at least one message in the SL communications may be transmitted to one or more configuration-receiving radio devices, e.g., any radio device other than the reference radio device and/or involved in the SL communications.

The area covered by the one or more base stations may be briefly or collectively referred to as covered area. The covered area may comprise one or more cells served by the one or more base stations, respectively.

The at least one message may be periodically transmitted. Each of the periodically transmitted messages may be indicative of a periodicity of the periodic transmission.

The technique, particularly the first method aspect, may be implemented according to any of the following options, variants or embodiments, optionally in combination with any of the features and embodiments disclosed with reference to the drawings.

The geographical limitation may extend beyond the area covered by the one or more base stations or corresponding cells. For example, the SL communications may be performed autonomously and/or without assistance from the one or more base stations.

The area covered by the one or more base stations or corresponding cells may be within the geographical limitation.

The SL communications may extend beyond the geographical limitation. For example, another radio configuration may be applied for the SL communications outside of the geographical limitation, i.e., if the geographical limitation of the given radio configuration is not fulfilled.

The received radio configuration and/or the at least one message may further be indicative of the temporal limitation for at least the subset of the radio configuration.

The received radio configuration and/or at least the subset of the received radio configuration may comprise the temporal limitation. The radio configuration and/or at least the subset of the radio configuration may comprise or may be indicative of radio resources for the SL communications.

The received radio configuration may comprise radio resources. The at least one message may be indicative of at least a subset of the radio resources for the SL communications.

The at least one message may be indicative of at least a subset of the radio resources. That is, the message may be indicative of the radio resources or a subset thereof. Herein, "at least the subset of the radio resources" may encompass the radio resources (e.g., to the extent received from the base station) or the (e.g., proper) subset of the radio resources.

The radio resources may be defined in terms of at least one of frequency (e.g., subcarriers of physical resource blocks), time (e.g., radio frames, slots or transmission time intervals, TTIs) and space (e.g., beam-formed spatial streams or multiple-input multiple-output, MIMO, layers).

The at least one message may be indicative of the geographical and/or temporal limitation that limits a usage of at least the subset of the radio resources for the SL communications.

The step of transmitting may comprise transmitting at least two messages each being indicative of a different one of disjoint subsets of the received radio resources as well as a different one of disjoint geographical and/or temporal limitations that limit a usage of the respective subsets of the radio resources.

The method may further comprise or initiate a step of partitioning the received radio resources in at least two disjoint subsets. Each of the at least two disjoint subsets may be associated with a different geographical area. Each of the at least one transmitted message may be indicative of one of the subsets of radio resources and the associated geographical area. For example, at least one message may be transmitted for each of the subsets of the radio resources and/or for each of the geographical areas.

The at least one message may be transmitted using a radio interface of the SL communications. The at least one message may be transmitted through a PC5 interface of the SL communications. Herein, a communication interface may also be referred to as a reference point.

The SL communications may comprise at least one of a unicast session, a groupcast session and a broadcast session. A group of radio devices participating in the SL communications may be defined by one or more identifiers of the unicast session, the groupcast session and/or the broadcast session. An identifier of the group may be an identifier of the groupcast session.

The at least one message may be transmitted directly or indirectly to at least one or each of a group of radio devices participating in the SL communications.

The at least one message may be indicative of the group of radio devices participating in the SL communications. For example, the at least one message may comprise an identifier of the group.

The radio configuration may be received at a reference radio device from the at least one base station serving the reference radio device. The reference radio device may be one of the group of radio devices (i.e., the reference radio device may be a radio device in the group of radio devices). The at least one serving base station may be among the one or more base stations.

The reference radio device may receive the radio configuration from the at least one base station in dedicated signaling or broadcast signaling. The reference radio device may be in a radio resource control (RRC) connected mode with the at least one base station.

Alternatively or in addition, the radio configuration for the SL communications may be received (i.e., obtained) from the local memory (e.g., local at or in the reference radio device) if the reference radio device is outside of the area covered by the one or more base stations or corresponding cells. The radio configuration stored in the local memory may be a predefined or preconfigured radio configuration. For example, the radio configuration in the local memory may be preconfigured during manufacturing of the reference radio device and/or preconfigured (e.g., updated) while the reference radio device is in the area covered by the one or more base stations or corresponding cells.

The method (e.g., according to the first method aspect) may be performed by a reference radio device that participates in the SL communications.

A radio device receiving the radio configuration and/or performing the method may also be referred to as a reference radio device.

The method (e.g., according to the first method aspect) may be performed by a reference radio device that is appointed by the at least one base station and/or an application layer of the SL communications.

The application layer may appoint the reference radio device based on at least one of a function and a position of the reference radio device among the group of radio devices. The application layer may control a traffic flow. The application layer may appoint the reference radio device based on the function of the reference radio device for the traffic flow and/or the position of the reference radio device in the traffic flow.

Each of the group of radio devices (i.e., each radio device in the group) may be at least one of a road vehicle and a road infrastructure. Alternatively or in addition, at least one or each of the reference radio device and the radio devices in the group may be embodied by at least one of a road vehicle and a road infrastructure. The road infrastructure may be a transport infrastructure or a traffic infrastructure.

The application layer may provide a vehicular or V2X service to the road vehicle or may control a driving operation of the road vehicle. For example, the reference radio device may be the leading vehicle of a platoon of road vehicles. The group of radio devices may be embodied by the road vehicles in the platoon.

The group of radio devices may be embodied by a platoon of road vehicles, respectively. The reference radio device may be embodied by the leading vehicle of the platoon.

Alternatively or in addition, the reference radio device may be a road infrastructure. The road infrastructure may be a road junction or a roadside unit configured to operate traffic control signals. The group of radio devices may be embodied by road vehicles at, near or using the road infrastructure.

The group of radio devices may comprise road vehicles at or using a road infrastructure and the reference radio device may be embodied by the road infrastructure.

The reference radio device may perform or may receive a data transmission in the SL communications, e.g. using the radio configuration. The data transmission may comprise at least one of a unicast transmission, a groupcast transmission and a broadcast transmission among the group of radio devices.

The transmission of the at least one message may be at least one of a unicast transmission, a groupcast transmission and broadcast transmission.

For example, if the group comprises two radio devices (e.g., the reference radio device and another radio device), the message may be unicasted (e.g., from the reference radio device to the other radio device). In the case of two or more other radio devices, the transmission of the at least one message may comprise multiple unicast transmissions. For example, two or more messages may be unicasted to the two or more other radio devices, respectively. Alternatively or in combination, the at least one message may be groupcasted or broadcasted to the group of radio devices (e.g., to all radio devices in the group other than the reference radio device).

The at least one message may be transmitted using radio resource control (RRC) signaling of the SL communications.

The received radio configuration may comprise transmission parameters. The at least one message may be indicative of at least a subset of the transmission parameters for the SL communications.

The transmission parameters for the SL communications, or at least the subset thereof, may comprise at least one of modulation and coding scheme (MCS), a transmit power, a MIMO configuration (e.g., a rank for a MIMO channel and/or a precoding matrix), an operative frequency of the SL communications.

The received radio configuration may comprise the geographical and/or temporal limitation.

The at least one message may be indicative of the geographical and/or temporal limitation in terms of one or more identifiers of at least one of cells, base stations, tracking areas (TAs), public land mobile networks (PLMNs), geographical areas and/or a validity duration.

The geographical areas (also: GeoAreas) may correspond to a predefined set of coordinates (e.g., polygons predefined by coordinates of the vertices of the respective polygon).

As to a second method aspect, a method of receiving a radio configuration for sidelink (SL) communications that extend beyond an area covered by one or more base stations is provided. The method comprises or initiates a step of receiving, from at least one message in the SL communications or local memory, at least a subset of the radio configuration and a geographical and/or temporal limitation thereof. The method further comprises or initiates a step of using the radio configuration for the SL communications if (e.g., only if) the geographical and/or temporal limitation is fulfilled and/or discarding the radio configuration for the SL communications if the geographical and/or temporal limitation is not fulfilled.

By receiving at least the subset of the radio configuration in the SL communications and/or from the local memory, at least some embodiments can receive at least the subset of the radio configuration from another radio device (e.g., the reference radio device) that is controlling, involved in or participating in the SL communications. By selectively using and/or discarding the radio configuration for the SL communications according to the geographical and/or temporal limitation, same or further embodiments can reduce or avoid interference between at least the subset of the radio configuration and another radio configuration, e.g., applicable outside of the geographical and/or temporal limitation.

The second method aspect may be performed at or by a configuration-receiving radio device, which may also be referred to as configured radio device. The configuration-receiving radio device may be a radio device terminating a sidelink of the SL communications. The configuration-receiving radio device may be out of the area covered by the one or more base stations.

Any feature or step disclosed for the first method aspect may be implemented accordingly for the second method aspect.

The technique, particularly the second method aspect, may be implemented according to any of the claims, optionally in combination with any of the features and embodiments disclosed with reference to the drawings.

The selective discarding may be implemented optionally. For example, the configured radio device performing the second method aspect only uses the radio configuration (e.g., the radio resources) as long as it is within the geographical and/or temporal limitation is not fulfilled. If the limitation is not valid, the configured radio device may keep the radio configuration stored in local memory and refrain from using it until the limitation is fulfilled again. For example, the configured radio device only uses the radio resources when it is within the geographical area.

Alternatively or in addition, if the if the geographical and/or temporal limitation is not fulfilled, at least one of the above-mentioned discarding operations may be performed. The radio configuration for the SL communications may be discarded, if conflicting radio configurations are received and the geographical and/or temporal limitation is valid for each of the conflicting radio configurations.

The method (e.g., according to the first and/or second method aspect) may be performed by a radio device. The geographical limitation may be fulfilled if the radio device fulfills the geographical limitation, e.g., if a position of the radio device is within geographical limitation (e.g., within the GeoArea of the geographical limitation).

The method may further comprise or initiate the step of transmitting a feedback signal in the SL communications. The feedback signal may be indicative of whether the radio configuration for the SL communications has been used or discarded.

An exceptional radio configuration may be used if the received radio configuration is discarded.

Another radio configuration for the SL communications may be requested from one of the one or more base stations if the received radio configuration is discarded or if a quality of service (QoS) requirement is not fulfilled in the SL communications using the received radio configuration.

A core network connected to the one or more base stations may provide the other radio configuration.

The method may further comprise or initiate the step of using a combination of the received radio configuration and the other radio configuration.

The method according to the second aspect may further comprise or initiate at least one of the steps and/or may further comprise at least one of the features corresponding to any one of the claims or embodiments of the first aspect.

The second method aspect may further comprise any feature and any step disclosed in the context of the first method aspect, or a feature or step corresponding thereto, e.g., a configuration-receiving counterpart to a configuration-distributing feature or step. As to a third method aspect, a method of transmitting a radio configuration for sidelink (SL) communications that extend beyond an area covered by one or more base stations is provided. The method comprises or initiates a step of transmitting, to a radio device participating in the SL communications, the radio configuration for the SL communications and a geographical and/or spatial limitation of the radio configuration. Alternatively or in addition, the method comprises or initiates a step of receiving, from a radio device participating in SL communications or the radio device participating in the SL communications, a report being indicative of the absence (or lack) of a radio configuration for the SL communications or an invalidity of the radio configuration for the SL communications, or a request for another radio configuration for the SL communications or a radio configuration for another SL communications. Alternatively or in addition, the method comprises or initiates a step of transmitting a control message to a radio device participating in SL communications or the radio device participating in the SL communications, the control message triggering the radio device to change its operation from a configured radio device to a reference radio device.

The reference radio device may be operative to perform the method according to the first method aspect. Alternatively or in addition, the configured radio device may be operative to perform the method according to the second method aspect.

The radio device may lack the radio configuration for the SL communications after expiry of a timer for the reception of the radio configuration from the reference radio device. Alternatively or in addition, the radio configuration for the SL communications may be invalid according to the geographical and/or temporal limitation.

The method (e.g., according to the third method aspect) may be performed by a base station, e.g., other than the one or more base stations that have transmitted the invalid (e.g., meanwhile invalid or invalid due to a change in location) radio configuration.

In any aspect, the technique may be implemented as a method of handling a missing radio configuration for SL communications. The radio configuration may be missing in a downlink control information or due to the absence of any base station coverage. Alternatively or in addition, the technique may be implemented as a method of distributing and/or receiving a radio configuration for resource allocation in SL communications.

The SL communications may belong to one SL communications session. The SL communications sessions may use unicast, groupcast or broadcast transmissions comprising an identifier of the SL communications session.

Being in or out of coverage may be defined for each of the radio devices base on a radio interface of the respective radio device towards any one of the base stations (e.g., an Uu interface) or based on a radio resource control (RRC) status of the respective radio device.

The transmission of the message from the reference radio device may be received by one or more configured radio devices in the SL communications. Any of the reference radio device and the one or more configured radio devices may be embodied by a road vehicle or road infrastructure.

Herein, the radio configuration for the SL communication (or at least the subset of the radio configuration) may also be referred to as SL radio configuration.

Any aspect of the technique can be beneficially applied in scenarios in which network-provided radio resources may be forwarded by one or more radio devices to one or more other radio devices involved in the SL communications (e.g., a given SL communication session). Due to a range of the SL communications, the radio resources to be used for the SL communications in the geographical and/or temporal limitation (e.g., in a geographical area) can be received by radio devices that are outside of the area covered by the one or more base stations. Hence, embodiments can expand the range of the SL communications. Alternatively or in addition, due to the range of the SL communications, the radio resources to be used for the SL communications in the geographical and/or temporal limitation (e.g., in the geographical area) can be received by radio devices that are located outside of the geographical limitation (e.g., outside of the geographical area). Same or further embodiments can avoid that the radio devices located outside of the geographical limitation (e.g., outside of the geographical area) by transmitting or receiving the message that is indicative of the geographical and/or temporal limitation (e.g., of the geographical area).

The reference radio device and/or the one or more configured radio devices may form, or may be part of, a radio network, e.g., according to the Third Generation Partnership Project (3GPP) or according to the standard family IEEE 802.11 (Wi-Fi). The first and second method aspects may be performed by one or more embodiments of the reference and configured radio devices, respectively, in the radio network. The radio network may be (e.g., partly and/or temporarily) a radio access network (RAN). The RAN may comprise the one or more base stations. Alternatively or in addition, the radio network may be (e.g., partly and/or temporarily) a vehicular, ad hoc and/or mesh network comprising two or more radio devices involved in the SL communications.

Any of the radio devices (e.g., the reference radio device and/or the one or more configured radio devices) may be a 3GPP user equipment (UE) or a Wi-Fi station (STA). Any of the radio devices may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the one or more base stations.

Any of the one or more base stations may be configured to provide radio access to any of the radio devices (e.g., at least within the area covered by the respective base station). Any of the one or more base stations base stations may be embodied by or referred to as a transmission and reception point (TRP), a radio access node or an access point (AP). The base station or one of the radio devices functioning as a gateway (e.g., between the radio network and the RAN and/or the Internet) may provide a data link to a host computer providing the first and/or second data. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the first and/or second method aspects disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively or in addition, the first and/or second method aspects may be encoded in a Field-Programmable Gate Array (FPGA) and/or an Application-Specific Integrated Circuit (ASIC), or the functionality may be provided for download by means of a hardware description language.

As to a first device aspect, a device for distributing a radio configuration for sidelink (SL) communications that extend beyond an area covered by one or more base stations is provided. The device may be configured to perform any one of the steps of the first method aspect.

As to a second device aspect, a device for receiving a radio configuration for sidelink (SL) communications that extend beyond an area covered by one or more base stations is provided. The device may be configured to perform any one of the steps of the second method aspect.

As to a further first device aspect, a device for distributing a radio configuration for sidelink (SL) communications that extend beyond an area covered by one or more base stations is provided. The device comprises at least one processor and a memory. Said memory comprises instructions executable by said at least one processor whereby the device is operative to perform any one of the steps of the first method aspect.

As to a further second device aspect, a device for receiving a radio configuration for sidelink (SL) communications that extend beyond an area covered by one or more base stations is provided. The device comprises at least one processor and a memory. Said memory comprises instructions executable by said at least one processor whereby the device is operative to perform any one of the steps of the second method aspect.

As to a third device aspect, a device for transmitting a radio configuration for sidelink (SL) communications that extend beyond an area covered by one or more base stations is provided. The device may be configured to perform any one of the steps of the third method aspect.

As to a further third device aspect, a device for transmitting a radio configuration for sidelink (SL) communications that extend beyond an area covered by one or more base stations is provided. The device comprises at least one processor and a memory. Said memory comprises instructions executable by said at least one processor whereby the device is operative to perform any one of the steps of the third method aspect.

As to a still further aspect a communication system including a host computer is provided. The host computer comprises a processing circuitry configured to provide user data, e.g., included in the first and/or second data of the multi-layer transmission. The host computer further comprises a communication interface configured to forward user data to a cellular network (e.g., the RAN and/or the one or more base stations) for transmission to a UE (e.g., any of the radio devices). A processing circuitry of the UE is configured to execute any one of the steps of the first and/or second method aspects. The UE further comprises a radio interface for at least one of uplink and downlink communications with the cellular network and the SL communications.

The communication system may further include the UE. Alternatively, or in addition, the cellular network may further include the one or more base stations configured for radio communication with the UE and/or to provide a data link between the UE and the host computer using or initiating the first and/or second method aspects.

The processing circuitry of the host computer may be configured to execute a host application, thereby providing the user data and/or any host computer functionality described herein. Alternatively or in addition, the processing circuitry of the UE may be configured to execute a client application associated with the host application.

Any one of the devices (e.g., the radio devices or UEs), the base stations, the communication system or any node or station for embodying the technique may further include any feature disclosed in the context of the method aspects, and vice versa. Particularly, any one of the units and modules disclosed herein may be configured to perform or initiate one or more of the steps of the first and/or second method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including 3GPP LTE (e.g., LTE-Advanced or a related radio access technique such as MulteFire), a Wireless Local Area Network (WLAN) implementation according to the standard family IEEE 802.11, for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
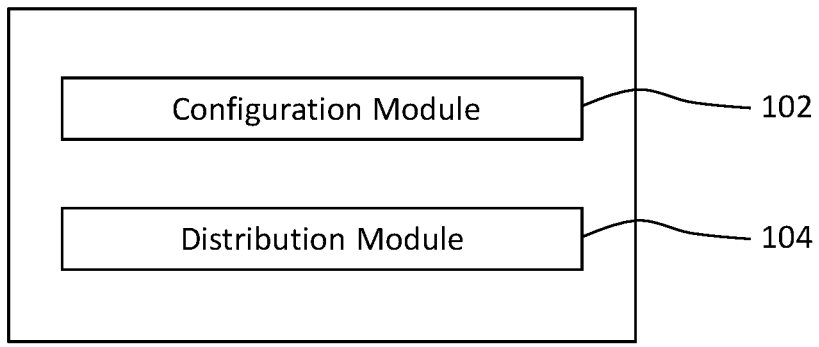
FIG. 1 shows a schematic block diagram of an embodiment of a device for distributing a radio configuration for sidelink communications.

FIG. 1 schematically illustrates a block diagram of an embodiment of a device for distributing a radio configuration for sidelink (SL) communications that extend beyond an area covered by one or more base stations. The device is generically referred to by reference sign 100.

The device 100 comprises a configuration module 102 that receives the radio configuration for the SL communications from at least one of the one or more base stations and local memory. The device 100 further comprises a distribution module 104 that transmits at least one message in the SL communications. The at least one message (e.g., collectively or each of the at least one message) is indicative of at least a subset of the radio configuration and a geographical and/or temporal limitation thereof (i.e., of at least the subset of the radio configuration).

Any of the modules of the device 100 may be implemented by units configured to provide the corresponding functionality.

The device 100 may also be referred to as, or may be embodied by, a configuration-distributing radio device or reference radio device. One or more radio devices receiving the at least one message may be referred to as configuration-receiving radio devices or configured radio devices. The reference radio device 100 and the one or more configured radio devices may be in direct radio communication by means of the SL, e.g., at least for the transmission of the message from the reference radio device 100 to the configured radio device. The configured radio device may be embodied by below-described device 200.

Figure 2:
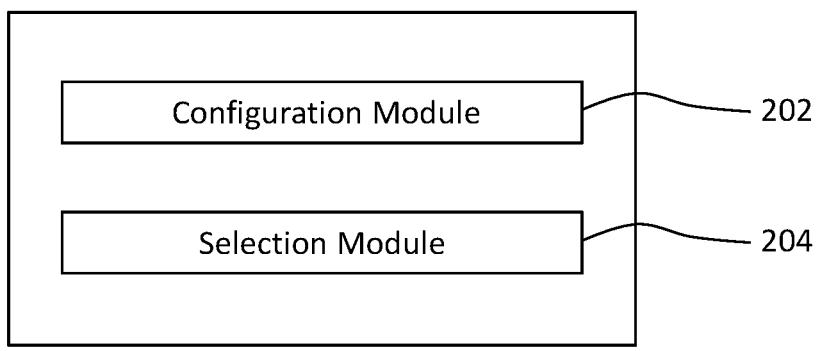
FIG. 2 shows a schematic block diagram of an embodiment of a device for receiving a radio configuration for sidelink communications.

FIG. 2 schematically illustrates a block diagram of an embodiment of a device for receiving a radio configuration for SL communications that extend beyond an area covered by one or more base stations. The device is generically referred to by reference sign 200.

The device 200 comprises a configuration module 202 that receives, from at least one message (e.g., collectively or from each of the at least one message) in the SL communications or from local memory, at least a subset of the radio configuration and a geographical and/or temporal limitation thereof (i.e., a geographical limitation of at least the subset of the radio configuration). The device 200 further comprises a selection module 204 that uses the radio configuration for the SL communications if (e.g., only if) the geographical and/or temporal limitation is fulfilled and/or discards the radio configuration for the SL communications if the geographical and/or temporal limitation is not fulfilled.

That is, the radio configuration may be selectively used (or applied) depending on whether or not the geographical and/or temporal limitation is fulfilled. The geographical limitation may correspond to a geographical area and/or a direction for beamforming transmission.

Any of the modules of the device 200 may be implemented by units configured to provide the corresponding functionality.

The device 200 may also be referred to as, or may be embodied by, a configuration-receiving radio device or a configured radio device. The at least one message may be received from a configuration-distributing radio device or reference radio device. The reference radio device and the configured radio device 200 may be in direct radio communication by means of the SL, e.g., at least for the reception of the at least one message from the reference radio device at the configured radio device 200. The reference radio device may be embodied by the device 100.

For example, the geographical limitation may be fulfilled if the configured radio device 200 is within the geographical area. Alternatively or in addition, the geographical limitation may be fulfilled if the configured radio device 200 performs a beamforming transmission in the direction specified by the geographical limitation. Optionally, the direction for beamforming transmission may depend on the position of the configured radio device 200. For example, at a boarder of the geographical area, the direction of the beamforming transmission may be inward the geographical area.

Figure 3:
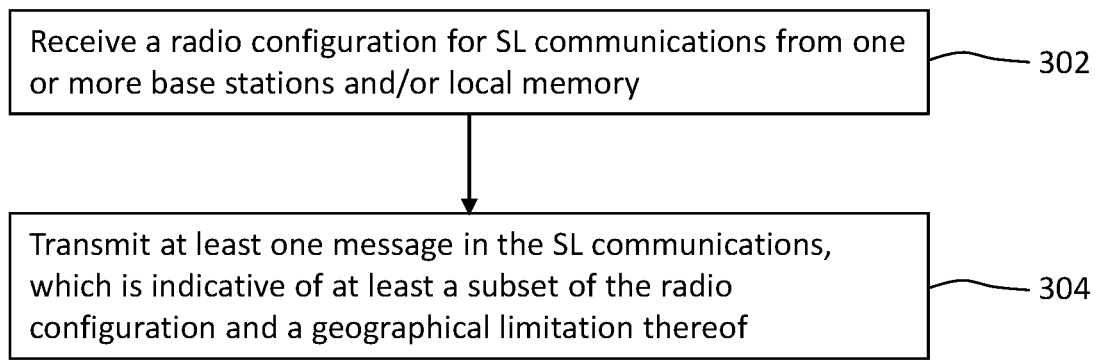
FIG. 3 shows a flowchart for a method of distributing a radio configuration for sidelink communications, which method may be implementable by the device of FIG. 1.

FIG. 3 shows an example flowchart for a method 300 of distributing a radio configuration for SL communications that extend beyond an area covered by one or more base stations. In a step 302, the radio configuration for the SL communications is received from at least one of the one or more base stations and local memory. In a step 304, at least one message is transmitted in the SL communications. The at least one message is indicative of at least a subset of the radio configuration and a geographical and/or temporal limitation thereof.

The method 300 may be performed by the reference radio device 100. For example, the modules 102 and 104 may perform the steps 302 and 304, respectively.

Figure 4:
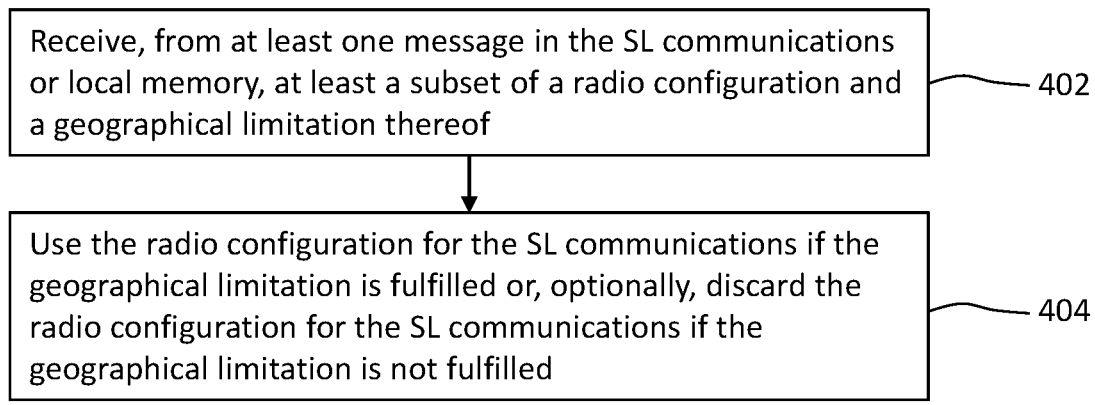
FIG. 4 shows a flowchart for a method of receiving a radio configuration for sidelink communications, which method may be implementable by the device of FIG. 2.

FIG. 4 shows an example flowchart for a method 400 of receiving a radio configuration for sidelink, SL, communications that extend beyond an area covered by one or more base stations. In a step 402, at least a subset of the radio configuration and a geographical and/or temporal limitation thereof is received from at least one message in the SL communications or local memory. In a step 404, the radio configuration for the SL communications is used (e.g., applied for a SL transmission or a SL reception in the SL communications) if (e.g., only if) the geographical and/or temporal limitation is fulfilled and/or the radio configuration for the SL communications discarded if the geographical and/or temporal limitation is not fulfilled.

The method 400 may be performed by the configured radio device 200. For example, the modules 202 and 204 may perform the steps 402 and 404, respectively.

In any aspect, the radio configuration may comprise radio resources for the SL communications. The radio resource may be based on a scheduling grant, a semi-persistent scheduling, a grant-free radio access and/or an instant radio access. Alternatively or in addition, the radio access to the radio resources indicated by the radio configuration may be subject to an access mechanism for shared radio resources (e.g., according to a listen-before-talk, LBT, procedure).

In any aspect, each of the reference radio device 100 and configured radio device 200 may be a radio device. Herein, any radio device may be a mobile or portable station and/or any radio device wirelessly connectable to a base station or RAN, and/or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL. Furthermore, any base station may be a station providing radio access, may be part of a radio access network (RAN) and/or may be a node connected to the RAN for controlling the radio access. For example, the base station may be an access point, for example a Wi-Fi access point.

Any embodiment may be based on existing or evolving SL features, e.g. SL features according to 3GPP or Proximity Services (ProSe). One of the potential extensions of the ProSe framework comprises support of V2X communications as an example for the SL communications. The SL communications may comprise any combination of direct communication involving at least one vehicle (V2X communications), e.g., any direct communication between vehicles (V2V), pedestrians (V2P) and infrastructure (V2I). V2X communication may take advantage of a network (NW, e.g., RAN) infrastructure, when available, but at least basic V2X connectivity may be possible even in case of lack of coverage. Providing a 3GPP-based V2X interface may be economically advantageous because of the 3GPP economies of scale and it may enable tighter integration between communications with the NW infrastructure (V2N) and V2P and V2V communications, as compared to using a dedicated V2X radio technology.

Figure 5:
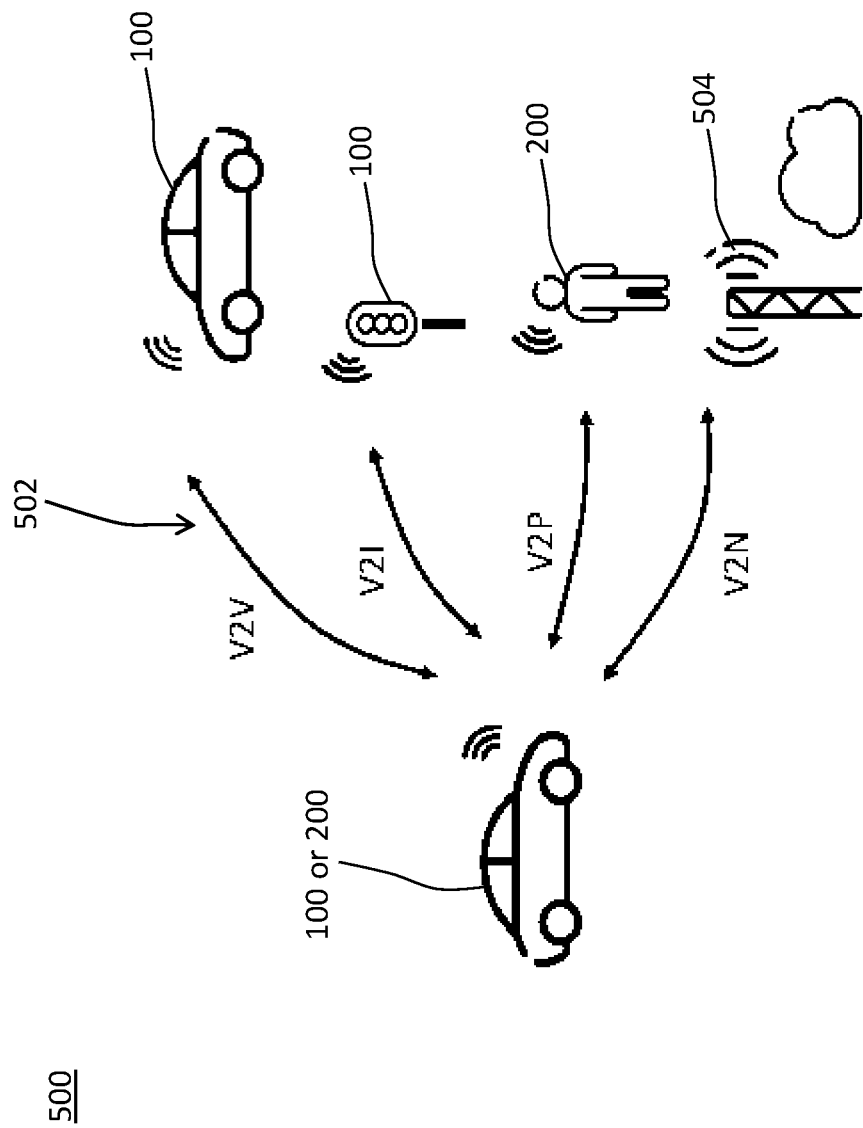
FIG. 5 schematically illustrates exemplary sidelinks for the sidelink communications involving embodiments of the devices of FIGS. 1 and 2.

FIG. 5 schematically illustrates an exemplary network environment for implementing the technique using V2X communications as an example for the SL communications 502. The SL communications 502 may comprise at least one of V2V, V2I, V2P and V2N communications.

The technique may be implemented based on the use of existing cellular infrastructure, e.g., for the one or more base stations 504.

V2X communications 502 may carry both non-safety and safety information, where each of the applications and services may be associated with specific requirements sets, e.g., in terms of latency, reliability, capacity, etc. From the application point of view, V2X communications 502 may comprise at least one of the following types of communication and/or services.

A first type of V2X communications 502 comprises vehicle-to-vehicle (V2V) communications, which covers any communication between vehicles using V2V applications and is predominantly broadcast-based. V2V communications may be realized by either direct communication between the devices in the respective vehicles, or via NW infrastructure such as a cellular network (e.g., the RAN or at least one of the one or more base stations 504). An example of V2V communications is the transmission of a cooperative awareness message (CAM) with vehicle status information (such as position, direction, and velocity) transmitted to other vehicles in the proximity repeatedly (every 100 ms to 1 s). Another example is the transmission of a decentralized environmental notification message (DENM), which is an event-triggered message to alert vehicles. These two examples are taken from the Intelligent Transport Systems (ITS) specification of the European Telecommunications Standards Institute (ETSI) for V2X applications, which also specifies the conditions under which the messages are generated. Main characteristic of V2V applications is the tight requirements on latency that can vary from 20 ms (e.g., for pre-crash warning messages) to 100 ms (e.g., for other road safety services).

A second type of V2X communications 502 comprises vehicle-to-infrastructure (V2I) communications, which comprises communication between vehicles and a Roadside Unit (RSU). The RSU is a stationary transportation infrastructure entity that is configured to communicate with vehicles in its proximity. Examples of V2I communications comprise transmissions of at least one of velocity notifications from the RSU to vehicles, queue information, collision risk alerts and curve speed warnings. Due to the safety-related nature of V2I, delay requirements are similar to those for V2V communications.

A third type of V2X communications 502 comprises vehicle-to-pedestrian (V2P) communications, which covers communication between vehicles and vulnerable road users, such as pedestrians, using V2P applications. V2P typically takes place between distinct vehicles and pedestrians either directly or via infrastructure such as cellular network.

A fourth type of V2X communications 502 comprises vehicle-to-network (V2N) communications, which covers communication between a vehicle and a centralized application server (e.g., an ITS Traffic Management Center) both using V2N applications, via NW infrastructure (e.g., a cellular network, the RAN or at least one of the one or more base stations). One example comprises a warning for bad road condition, which is sent to all vehicles in a wide area, or traffic flow optimization in which a V2N application suggests a velocity to vehicles and coordinates traffic lights. Therefore, V2N messages are supposed to be controlled by a centralized entity (e.g., the Traffic Management Center) and provisioned to vehicles in a large geographical area, rather than in a small area. Additionally, unlike V2V or V2I communications, latency requirements are more relaxed in V2N, because it is not meant to be used for non-safety purposes, e.g. 1 s latency requirement is typically considered.

The SL communications 502 between the radio devices, e.g., embodiments or the devices 100 and/or 200, may use the radio interface PC5 defined by 3GPP. As previously mentioned, SL communications 502 (e.g., the D2D or ProSe communications) have been standardized in 3GPP since release 12 over the PC5 interface in cellular spectrum. In 3GPP release 12, two different transmission modes (or operation modes) have been specified by 3GPP.

In a first mode (mode-1), an embodiment of the UE 100 (or the UE 200) in a radio resource control (RRC) connected mode (RRC_CONNECTED mode) may request radio resources for the SL communications 502 (also: SL D2D resources). At least one of the one or more base stations (e.g., an eNB or gNB) grants the radio resources via a physical downlink control channel (PDCCH, e.g., in downlink control information format 5, DCI5) or via dedicated signaling according to the step 302.

In a second mode (mode-2), an embodiment of the UE 100 (or the UE 200) autonomously selects resources (e.g., the subset of resources) for transmission from a pool of available resources (e.g., the received radio resources) that at least one of the one or more base stations (e.g., an eNB or gNB) provides according to the step 302 in broadcast via system information block (SIB) signaling for transmissions on carriers other than a primary cell (PCell) or via dedicated signaling for transmission on the PCell. Therefore, unlike the first mode, the second mode can be performed also by UEs 100 or 200 in an RRC idle mode (RRC_IDLE mode), and in some cases even by UEs 100 or 200 out of coverage (i.e., out of the coverage area). In particular, when an embodiment of the UE 100 or 200 is out-of-coverage, the UE may use a set of preconfigured radio resources, e.g., stored in the Universal Subscriber Identity Module (USIM) or the Universal Integrated Circuit Card (UICC) of the UE 100 or 200, which are example for the local memory.

In 3GPP release 14, the usage of SL communications 502 is extended to V2X communications. The original physical (PHY) layer for the SL communications 502 in 3GPP release 12 was constructed for scenarios with a small number of UEs 100 and 200 competing for the same physical resources in the spectrum, e.g., to carry voice packets for a Mission Critical Push To Talk (MCPTT) traffic, and assumed low mobility of the UEs 100 and 200. On the other hand, in V2X communications, the SL may be able to cope with higher load (e.g., hundreds of cars potentially contending for physical resources), to carry time-triggered or event-triggered V2X messages (e.g., CAM or DENM), and with high mobility of the UEs 100 and 200. For such reasons, enhancements to the PHY layer of the SL communications 502 have been discussed in 3GPP.

A first enhancement specified in 3GPP release 14 comprises a third transmission mode (mode-3), which resembles the first mode (mode-1) in that it is one of the one or more base stations 504 (e.g., an eNB) that explicitly assigns SL resources to the UE 100. However, unlike the first mode, the base station 504 (e.g., the eNB) has the possibility to configure the radio resources for the SL communications 502 semi-persistently (i.e., by means of a semi-persistent scheduling, SPS). For example, at least one of the one or more base stations 504 (e.g., an eNB) assigns a SL grant for periodic transmissions on a certain frequency resource according to the step 302.

A second enhancement comprises channel sensing and sensing-aware UE-autonomous resource allocation, which corresponds to a fourth transmission mode (mode-4). Unlike random resource selection, which is the base for SL communications according to 3GPP releases 12 and 13, embodiments of the UEs 100 or 200 according to 3GPP release 14 are expected to continuously sense the channel and search for radio resources in the different part of the spectrum that are less interfered. Such sensing has the objective of limiting collisions between UEs. The second enhancement also comprises a resource reservation procedure, e.g., in an implementation of the step 302, which allows the UE 100 or 200 to reserve a certain number of transmitting resources for SL transmission on different Time Transmission Intervals (TTIs). In particular, at the beginning of the resource selection procedure, a transmitting counter is initialized. The counter is stepped (e.g., decremented) whenever a SL transmission is performed. When the counter reaches 0 (zero), the embodiment of the UE 100 or 200 performs a further resource reselection procedure. Resource reselection can also be performed if certain events occur, e.g. if an urgent packet needs to be transmitted and the previously reserved resources do not allow to fulfill the latency requirement of the packet, or if certain number of reserved resources are left unused.

The SL communications may be implemented according to 3GPP NR, particularly NR V2X. In the Technical Specification Group for Service and System Aspects (SA) of 3GPP, the working group for services, SA1, has defined service requirements for V2X services, e.g., in the study and work item 720003 (FS_eV2X). SA1 has identified 25 use cases for advanced V2X communications or V2X services, which are used in 5G (i.e., LTE and NR). Such use cases are categorized into four use case groups, namely vehicles platooning, extended sensors, and advanced driving and remote driving.

The consolidated requirements for each use case group are captured in the 3GPP document TR 22.886, version V16.2.0. For these 5G SL communications 502 and associated applications, NR requirements to meet the needed data rate, capacity, reliability, latency, communication range and (e.g., relative) velocity are more stringent, e.g., compared to 4G SL communications.

While the resource allocation, e.g., in the step 302, for SL communications according to 3GPP NR may take the LTE V2X framework described above (e.g., the transmission modes) as a baseline, some fundamental enhancements can enable fulfilling the NR requirements. For example, in order to meet the NR requirements, some improvements may be introduced in layer-1 and layer-2 of the access stratum (AS) protocols, e.g., to enforce link adaption and Quality of Service (QoS) handling. Such enhancements may comprise at least one of a feedback in the SL communications 502 indicative of SL channel state information (CSI), a feedback in the SL communications 502 for SL Hybrid Automatic Repeat Request (HARQ), ARQ schemes for the SL communications 502, an Acknowledged Mode (AM) for the SL communications 502 on the Radio Link Control (RLC) layer and QoS admission control for the SL communications 502.

Alternatively or in addition, the SL communications 502, e.g. for NR V2X services or other radio technologies, may be transmitted using different casting schemes. For example, a unicast transmission may be performed for some applications, e.g., for cooperative driving, dynamic ride sharing and sharing of video or sensor data. For platooning use cases (i.e., grouping of vehicles into a platoon), the SL communications 502 may comprise groupcast communications. For broad provisioning of alert messages, the SL communications 502 may comprise broadcast communications. The radio resources, e.g., allocated in the step 302, may depend on specific casting schemes, interference and/or channel conditions and different QoS requirements.

The SL communications 502 may comprise a process for mobility handling. To perform the SL communications 502 on certain V2X frequency, the UEs 100 or 200 may be configured with signaling (e.g., SIB or RRC signaling), which conveys the radio configuration, e.g., as an implementation of the step 302.

The radio configuration may comprise radio resources for the SL communications 502 and/or one or more transmitting parameters for the SL communications 502. If the UE 100 or 200 is out-of-coverage, it is not capable of receive the radio configuration (e.g. in the SIB or RRC signaling). Instead, the UE 100 or 200 uses a preconfigured radio configuration (e.g., preconfigured radio resources) from its local memory. For example, the preconfigured radio configuration is provisioned by higher layers and/or stored in the SIM or UICC of the respective UE.

For example, whenever the UE 100 or 200 performs a cell selection, a cell reselection or a handover, the UE 100 or 200 may acquire a new radio configuration, e.g., according to the step 302 (e.g. by means of SIB or RRC signaling) from the selected cell, the reselected cell or the target cell. While performing the handover, the UE 100 or 200 may be configured with an exceptional pool of radio resources to be used for the (e.g., whole) duration of the handover, e.g., so to minimize V2X service interruption. Similarly, before going out-coverage, e.g., when the UE 100 or 200 starts detecting an indicator for being out of synchronization (also: out-of-sync indicators) at the PHY layer, or when the UE 100 or 200 is performing connection establishment or connection reestablishment, the UE 100 or 200 may use the exceptional radio resources, e.g., to limit V2X service interruption.

Mobility aspects are particularly important when certain QoS performances should be maintained for specific use cases. In particular, satisfactory QoS should be maintained while the UEs 100 or 200 involved in a unicast or groupcast SL communications 502 are moving from one cell or base station 504 to another and/or while moving from in-coverage to out-of-coverage, or vice versa. To achieve stable performances while the UEs 100 or 200 are moving, there are several methods.

For example, at least one of the one or more base stations 504 may configure the UEs 100 or 200 involved in the SL communications (e.g., a specific SL communication session, e.g., using unicast, groupcast or broadcast transmissions) with a set of SL radio resource (i.e., transmitting and/or receiving resources) and radio parameters (i.e., transmission and/or reception parameters) for a given geographical area. Such set of SL resources may be used for the SL communications 502 (e.g., a SL transmission) by the UEs 100 or 200 as long as the UEs are moving within the geographical area. If the geographical area is large enough, a performance of the SL communications 502 can remain stable and the UEs 100 or 200 involved in the SL communications 502 (e.g., the given SL communication session) can meet the QoS requirements.

The radio configuration may be provided by at least one or each of the one or more base stations 504 (e.g., the gNBs) in the geographical area. Optionally, some special UEs, e.g., embodiments of the UE 100, provide the radio configuration directly to other UEs, e.g., embodiments of the UEs 200. Such special UEs 100 may need to have some special capabilities and they may be located in good radio coverage so that they can provide radio configuration to other UEs 200 reliability.

The UE 100 configured with this special task (e.g., the first method aspect, i.e., an implementation of the method 100) may be a cluster head. For example, an embodiment of the UE 100 is located in the certain (e.g., leading or central) position (e.g., relative to the one or more other UEs 200). The embodiment of the UE 100 is in charge of controlling the one or more other UEs 200 in their surroundings. Particularly, in a platoon deployment, the platoon header (e.g., the leading vehicle) may embody the UE 100, which leads a group of vehicles comprising one or more embodiments of the other UE 200.

For example, if in a SL communication session (e.g., using unicast, groupcast and/or broadcast transmissions) there is one UE 100 in coverage that can receive radio resource (i.e., the radio configuration) for the SL communications 502 directly from the base station (e.g., a gNB) according to the step 302, and one or more other UEs 200 that are out-of-coverage, the UE 100 in-coverage may provide the radio configuration indicative of the radio resources to be used for the SL communications 502 (e.g., for unicast communications) to the out-of-coverage UE 200 according to the step 304. Or, similarly, in a SL communication session there may be some UEs 100 in connected mode (e.g., RRC_CONNECTED mode) receiving the radio configuration (e.g., by means of dedicated signaling) for the concerned SL communication session, including the radio resources (e.g., the pool of radio resources for SL transmission and/or SL reception) and/or relevant radio parameters (e.g., for SL transmission and/or SL reception), directly from the base station (e.g., the gNB). Such radio configuration for the SL communications 502 may then be provided by such UEs 100 to other UEs 200 involved in the same SL communication session via the SL interface as examples of the step 304.

Figure 6:
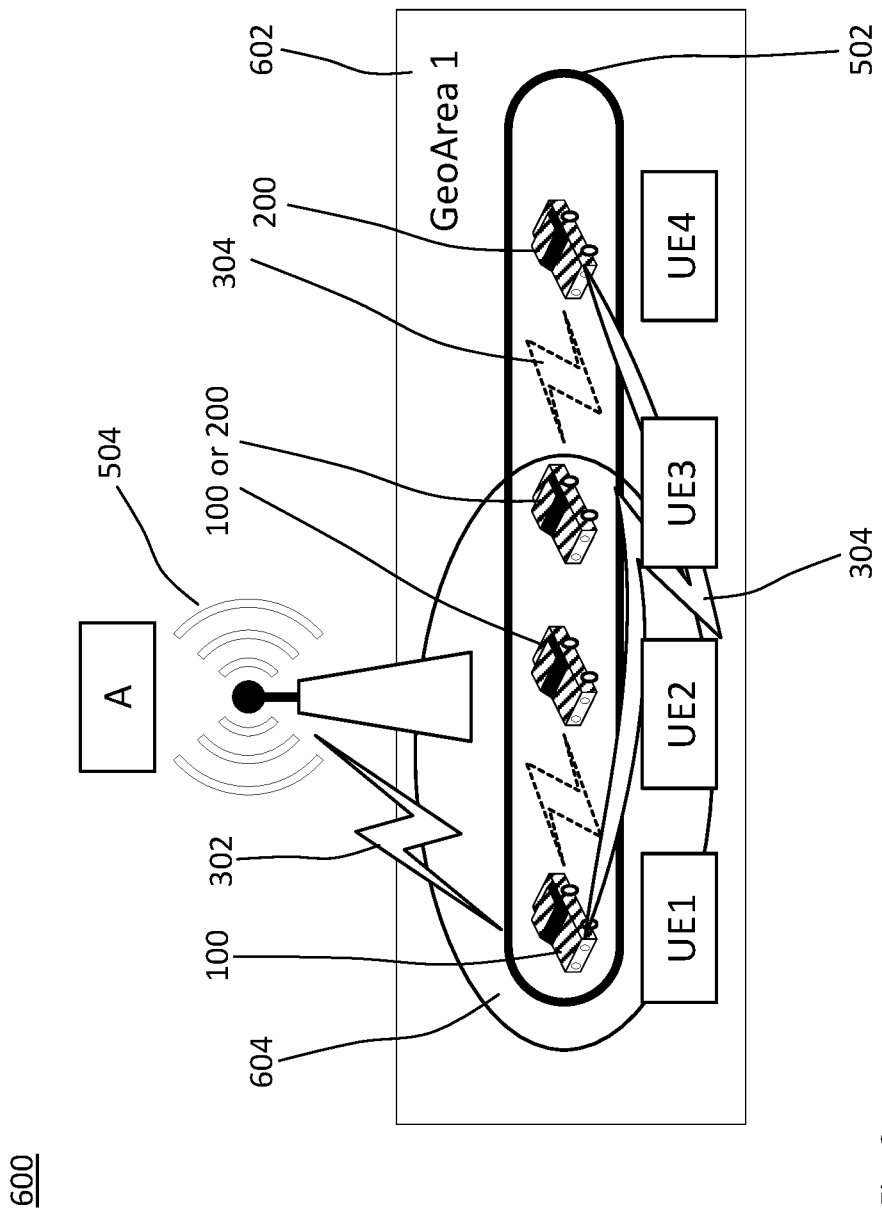
FIG. 6 schematically illustrates a first radio environment for implementing the methods of FIGS. 3 and 4.

FIG. 6 schematically illustrates SL communications 502, e.g., using groupcast transmissions. The situation 600 illustrated in FIG. 6 may be an illustrative example of the above scenario. In particular, the UEs 100 and 200 may be embodied by vehicles forming a platoon, which are labelled UE1 to UE4 in FIG. 6. The UE1 is assumed to be the platoon header (e.g., the leading vehicle). At least the UE4 may be out of the area covered by the base station 504, i.e., outside of the cell 604.

The UE1 may embody the UE 100. The UE4 (or each of UE2, UE3 and UE4) may embody the UE 200.

The platoon header 100 receives the radio configuration for the SL communications 502 including a set of SL radio resources to be used for the platoon communications 502 by all UEs 100 and 200 in the platoon according to the step 302. The radio configuration may be valid only in a certain geographical area 602 to avoid interference towards neighboring areas and/or neighboring cells. In turn, the platoon header relays such set of radio resources via the SL communications 502 to all other UEs 200 in the platoon which are under its SL coverage. The SL coverage of the UE 100 may comprise direct SL communications 502 (e.g., a star topology) and/or mesh SL communications 502 using at least one hop via UEs 200 in the SL communications 502.

The step 304 may use SL RRC signaling. The relayed set (i.e., at least the subset of the received radio configuration) can be the same set provided by the base station 504 (e.g., a gNB) or a proper subset thereof. In this way, all the UEs 100 and 200 in the platoon, irrespective of the Uu coverage and irrespective of the RRC status (e.g., being CONNECTED, IDLE or INACTIVE mode), can use the same set of radio configurations (particularly, the same radio resources) which are dedicated for this SL communications 502 (e.g., the specific platoon). As an advantage, the SL communications 502 are not interfered by other UEs in the surroundings.

Figure 7:
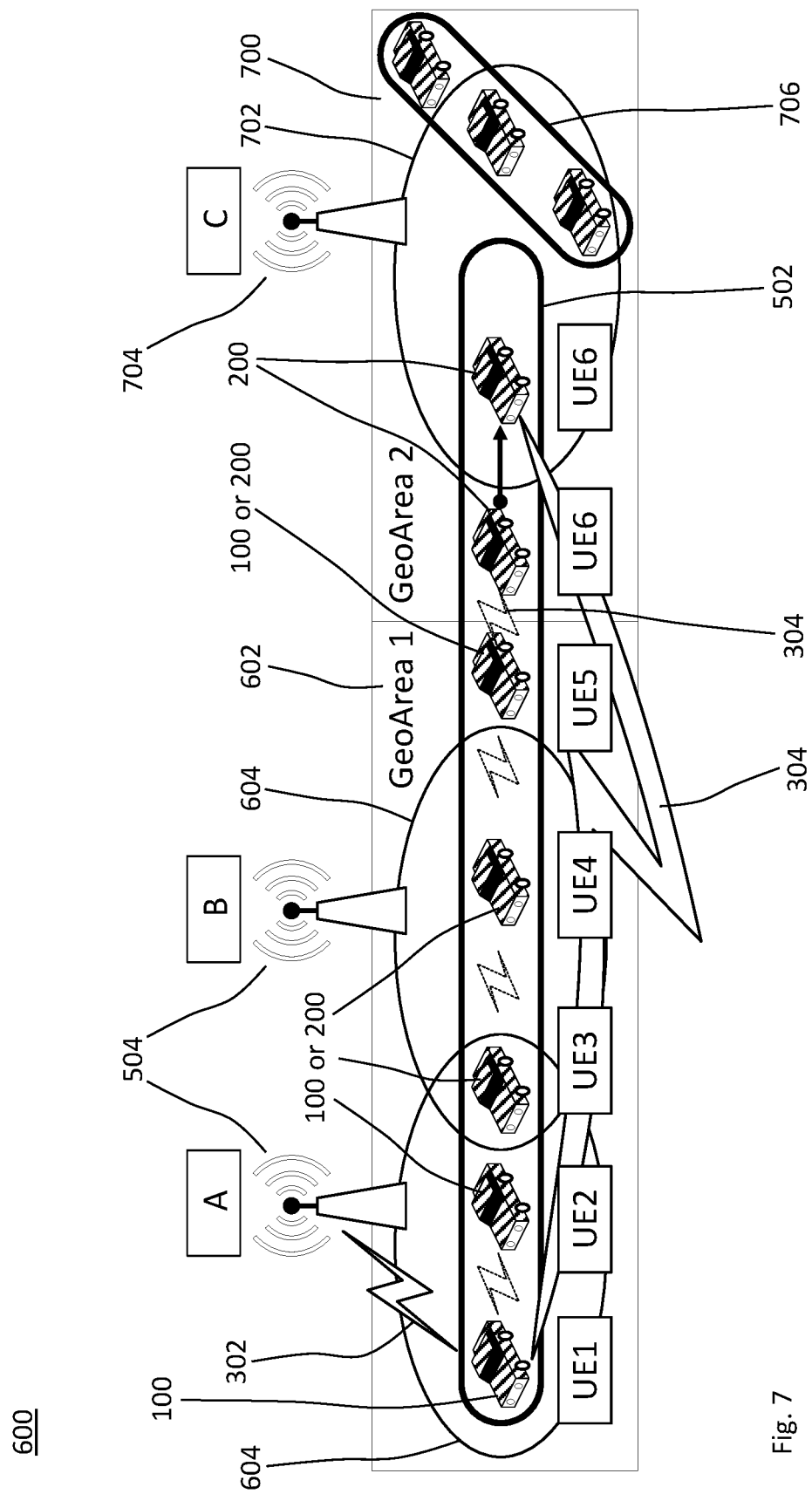
FIG. 7 schematically illustrates a second radio environment for implementing the methods of FIGS. 3 and 4.

As schematically illustrated in FIG. 7, a potential issue that may arise when using the same set of radio resources in SL communications 502 extending beyond the area covered by a RAN (e.g., the one or more base stations 604) is that SL coverage 502, i.e., the area covered by the SL communications 502, may span several cells 604 and 702 or several geographical areas 602 and 700. Therefore, if UEs 100 or 200 involved in the same SL communications 502 are under different network coverage (e.g. camping on or connected to different cells 604 and 702 or located in different geographical areas 602 and 700), the set of radio resources for the SL communications 502 that the one or more UEs 200 should use may interfere with another set of radio resources, e.g., for other SL communications 706, allocated in neighboring cells 702 or neighboring geographical areas 700. By way of example, such an interference may occur when a UE 200 (e.g., the UE6) moves into the coverage of the other cell 702 while maintaining its radio configuration for the SL communications 502 (which is indicated by a black arrow in FIG. 7).

As an example of the step 302, the gNB labeled A as one of the base stations 504 in FIG. 7 provides SL resource allocation (i.e., radio resources for the SL communications 502) to the UE 100 labeled UE1 to be used for SL communications, i.e., within the platoon to which UE1 belongs. The UE 100 labelled UE1 forwards the set of radio resources (or a subset of them) for the SL communications 502, which were provided in the step 302 by one of the gNBs 504, to the one or more other UEs 200 in the platoon by transmitting the at least one message. This set of radio resources indicated in the message is valid in the geographical area 602 (labeled GeoArea1) in the FIG. 7.

However, it may happen that the SL communications 502 (e.g., the SL coverage of the UE 100 (labelled UE1) in case of a direct transmission 304) extends to (i.e. overlaps with), or spans, another cell 702 (e.g., served by another base station 704, labelled C in FIG. 7) in another geographical area 700 (labelled GeoArea2 in FIG. 7). A planning of the radio resources for SL communications 502 and/or 706 is such that the radio resources for SL communications 502 allocated by the one or more base stations 504 (e.g., the gNB A) can be used without interference within the geographical limitation 602 associated with the one or more base stations 504 (e.g., the GeoArea1). However, these radio resources may be interfered by and/or interfere with other radio resources outside of the geographical limitation 602, e.g., in another geographical area 700 (such as the GeoArea2 in FIG. 7). Alternatively or in addition, the other radio resources outside of the geographical limitation 602 may be allocated to other SL communications 706 and/or allocated by a base station 704 other than the one or more base stations 504 (e.g., the gNB C). More specifically, the other SL communication 706 may be allocated to a group of UEs in another platoon or in proximity to a road infrastructure. Alternatively or in addition, the other radio resources outside of the geographical limitation 602 may be allocated to uplink and/or downlink communications in a cell 702 other than the cells 604 covered by the one or more base stations 504.

By transmitting in the message the geographical limitation in association with the radio resources, a performance degradation for UEs located in the other geographical area 700 can be avoided. The other geographical area 700 is different from the geographical area 602 in which the radio resources provided for the SL communications 502 are to be used.

The SL communications 502 schematically illustrated in FIG. 7, particularly the transmission 304, may be implemented using groupcast communications. The SL communications 502 may correspond to one SL communications sessions, e.g., defined by one or more identifiers (IDs, also: identities) of the groupcast communications.

Further details of exemplary implementations of the methods 300 and 400 are described, which for conciseness, concreteness, clarity and not limitation, mainly refer to use cases of SL communications 502 within a platoon of vehicles and/or mainly use groupcast transmissions for the SL communications 502. However, such exemplary implementations can be readily applied to other types of SL communications, e.g., in which UEs 100 and 200 are allocated a set of radio resources for unicast and/or broadcast communications with each other. Moreover, a group ID, a unicast ID and/or a broadcast ID are used as exemplary means for detecting, defining and/or indicating a specific link associated to a certain SL group, SL unicast and/or SL broadcast as examples for the SL communications 502. The extent of the SL communications may be defined in terms of the UEs 100 and 200 participating in the SL communications 502, which is also referred to as SL communications session. The SL communications 502 may be defined by at least one of V2X services, the group ID, the unicast ID, the broadcast ID, a SL communications session ID and a set of UEs 100 and 200 participating in the SL group, the SL unicast and/or the SL broadcast.

In an implementation of the first aspect, for given SL communications 502, there is a UE 100 (e.g., UE1 in FIGS. 6 and 7), which provides a SL radio configuration to one or more UEs 200 involved in the same SL communications 502, e.g. which belong to the same group in case of platoon-type SL communications 502. The radio configuration (e.g., a set of SL radio resource configurations) may contain a plurality of information. For example, the radio configuration may comprise the radio resources for the SL communications 502 in the time domain and/or the frequency domain to be used by the UEs 100 and 200 in the SL communication 502. Alternatively or in addition, the radio configuration may comprise transmission parameters for the SL communications 502, e.g., at least one of a modulation and coding scheme (MCS), a transmit power, a multiple-input multiple-output (MIMO) channel configuration (e.g., a precoding matrix indicator or a rank indicator) and an operative frequency of the concerned SL radio resource configuration. Alternatively or in addition, the radio configuration received in the message and/or from local memory may be indicative a type of traffic (e.g., V2X services) which are admitted for the SL communications 502, the related QoS requirements, an ID of the specific SL communications 502 (such as the group ID, unicast ID or a broadcast ID).

The radio configuration (e.g., the set of SL radio configuration) may be provided to the UE 100 (e.g., the UE1 in FIGS. 6 and 7) by at least one of the one or more baste stations 504 (e.g., the gNB in FIGS. 6 and 7), which covers the UE 100 via dedicated and/or broadcast signaling according to the first alternative of the receiving step 302. Alternatively or in addition, the radio configuration may be preconfigured in the local memory, e.g., in case the UE 100 is out-of-coverage according to the second alternative of the receiving step 302.

In any implementation, the radio configuration indicated in the message (e.g., the set of SL radio configuration) which the UE 100 provides over the SL communications 502 to the one or more other UEs 200 in the step 304 may be a (e.g., proper) subset of the received radio configurations, e.g., a subset of the above configured or preconfigured SL radio configuration, particularly a subset of the SL time and/or frequency resources received in the step 302. The set of SL radio configuration is provided via PC5 RRC signaling in the step 304.

Together with at least the subset of the received radio configuration (e.g., the set of SL radio configuration) in the at least one message, the UE 100 may also indicate at least one of the following pieces of information in the at least one message transmitted in the SL communication 502 (e.g., through PC5 RRC signaling). Any of these pieces of information may implement the geographical limitation and/or a temporal limitation.

A first piece of information comprises an ID for the covered area or cell 604, an ID for the Public Land Mobile Network (PLMN) comprising the one or more base stations 504 and an ID of the geographical area 602 (e.g., the GeoArea ID). A second piece of information comprises the one or more cell IDs in which the SL radio configuration is valid. A third piece of information comprises the one or more IDs of the one or more base stations 504 (e.g., gNB IDs) in which the SL radio configuration is valid. A fourth piece of information comprises the one or more IDs for one or more Tracking Areas (TAs) in which the SL radio configuration is valid. A fifth piece of information comprises the one or more IDs of the PLMN in which the SL radio configuration is valid. A sixth piece of information comprises the one or more IDs of the geographical areas 602 (e.g., GeoArea IDs) in which the SL radio configuration is valid. The GeoArea ID may correspond to a predefined set of geographical coordinates which determine a specific geographical area. A seventh piece of information comprises a validity duration of the SL radio configuration, which may for example be determined from the point in time in which UE 100 transmits the message indicative of the validity duration. An eighth piece of information comprises a periodicity at which the SL radio configuration is transmitted by the UE 100.

The UE 100 may be appointed by any one of the base stations 504, e.g., by the base station 504 serving the UE 100 (e.g., the gNB A in FIGS. 6 and 7) and/or by an application function in a cloud node (e.g. V2X server) to provide the SL radio configuration to other UEs 200. For example, the UE 100 may be a UE appointed as a cluster head in a group of two or more UEs 100 and 200, or a UE with special RAN capabilities (e.g., a gateway functionality among in mesh network of UEs).

In an implementation of the second aspect, which is combinable with any embodiment or implementation of the first aspect, there are one or more UEs 200 (e.g., any of the UE2 to UE6 in the FIGS. 6 and 7) receiving the RRC signaling from the UE 100 containing the SL radio configuration. The UE 200 may discard the SL radio configuration if, e.g., at the side of the UE 200, the geographical limitation 602 is not fulfilled, the temporal limitation is not fulfilled and/or any further condition is not fulfilled. The further condition may comprise any combination of the following conditions.

A first condition is not fulfilled if the UE 200 is currently camping on a cell or is currently connected to a cell, whose cell ID is not in the list of cell IDs indicated by UE 100 in the at least one message (i.e., in the SL radio configuration signaling 304 and 402), i.e. the received SL radio configuration is not valid for the cell of UE 200. A second condition is not fulfilled if the UE 200 is currently camping on a cell or is currently connected to a cell associated with a Tracking Area identity, whose Tracking Area ID is not in the list of Tracking Area IDs indicated by UE 100 in the at least one message (i.e., the SL radio configuration signaling 304 and 402), i.e. the received SL radio configuration is not valid for the Tracking Area of the UE 200. A third condition is not fulfilled if the UE 200 is currently camping on a cell or is currently connected to a cell controlled or served by a base station 504 (e.g., a gNB), whose base station ID (e.g., a gNB ID) is not in the list of base station IDs (e.g., gNB IDs) indicated by UE 100 in the at least one message (i.e., in the SL radio configuration signaling 304 and 402), i.e. the received SL radio configuration is not valid for the base station of the UE 200. A fourth condition is not fulfilled if the UE 200 is currently camping on a cell or is currently connected to a cell controlled by a PLMN, whose PLMN ID is not in the list of PLMN IDs indicated by the UE 100 in the at least one message (i.e., the SL radio configuration signaling 304 and 402), i.e. the received SL radio configuration is not valid for the PLMN of UE2. A fifth condition is not fulfilled if the UE 200 is currently located in a geographical area (e.g., a GeoArea), whose ID (e.g., a GeoArea ID) is not in the list of geographical area IDs (e.g., GeoArea IDs) indicated by the UE 100 in the at least one message (i.e., the SL radio configuration signaling 304 and 402), i.e. the received SL radio configuration is not valid for the geographical area of the UE 200. A sixth condition is not fulfilled if any of the above condition is triggered, e.g., upon cell selection, cell reselection, handover, RRC establishment, RRC resume and/or RRC reestablishment.

A seventh condition is not fulfilled if the UE 200 is not currently configured with a SL radio configuration either by any of the one or more base stations 504 (e.g., the gNB A) or preconfigured, for the frequency in which the concerned SL communications 502 are to be performed according to the radio configuration. For example, the base station (e.g., the gNB A) under which the UE 200 is in coverage does not provide a SL radio configuration for SL operations at all, or the base station does not provide SL radio configuration for the concerned SL communications 502, e.g. for the specific SL group communication or SL communications session (e.g., in case of platooning). The UE 200 may enter this negative condition when, upon performing cell selection or cell reselection, the UE 200 does not decode any SIB signaling containing SL radio configuration and/or receives no SL radio configuration that is valid for this specific SL communication (e.g., in terms of groupcast ID, unicast ID or broadcast ID) for a given frequency of interest. Alternatively or in addition, the UE 200 may enter this negative condition when, upon entering the connected mode (e.g., the RRC_CONNECTED mode), the UE 200 does not receive any valid SL radio configuration valid for this specific SL communication (e.g., in terms of groupcast ID, unicast ID or broadcast ID) for a given frequency of interest.

An eighth condition is not fulfilled if the radio configuration for the SL communications 502 (i.e., the SL radio configuration) indicated by the UE 100 in the at least one message is inconsistent with, colliding with or partly colliding with another radio configuration configured by the other base station 704 (e.g., the gNB C in FIG. 7) for the UE 200 or preconfigured for the UE 200 (e.g., in the local memory of the UE 200).

The other radio configuration may relate to other SL communications 706 or to the specific cell, geographical area and/or PLMN in which the UE 200 is located. For example, the UE 200 may enter this negative condition if the amount of colliding radio resources (e.g., in time and/or frequency) for the SL communications 502 is above a certain threshold, or if the UE 200 is not capable to perform SL transmissions in the SL communications 502 based on both the SL radio configuration provided by UE 100 in the step 402 and the SL radio configuration configured by the other base station 704 or preconfigured by its local memory. For example, the UE 200 may limited in terms of its transmission capabilities based on the different SL radio configuration such that it cannot perform both SL operations following the two different SL radio configurations.

The UE 200 may discard, i.e. de-configure, a previously acquired or configured SL radio configuration received from the UE 100, if the validity time of the SL radio configuration is expired as a negative ninth condition.

The UE 200 may discard, i.e. de-configure, a previously acquired or configured SL radio configuration received from the UE 100, if as a negative tenth condition the UE 200 receives from a third UE (e.g., the UE3 in FIGS. 6 and 7), at a later point in time another SL radio configuration 706 which fulfills certain requirements (e.g., QoS requirements or channel condition requirements). The requirements may comprise at least one of: the SL radio channel towards the third UE is better than the SL radio channel towards the UE 100; the UE 200 is closer to the third UE than to UE 100; and the third UE is located in the same cell, served by the same gNB, in the same GeoArea (e.g., according to the GeoArea ID) and/or in the same Tracking Area as the UE 200 whereas the UE 100 is not.

The UE 200 may discard, i.e. de-configure, a previously acquired or configured SL radio configuration received from the UE 100 or at least one of the base stations 504 (e.g., from the gNB A in FIGS. 6 and 7), if as a negative eleventh condition a third UE (e.g., the UE3 in FIGS. 6 and 7) has not received the SL radio configuration from the UE 100 (and/or from the UE 200). The UE 200 may receive a notification from the third UE, which is indicative of the third UE discarding or not using the SL radio configuration from the UE 100.

The at least one message in the steps 304 and 402 may be indicative of the geographical limitation, the temporal limitation and/or any of the further conditions. For example the at least one message may comprise certain information, such as cell IDs, Tracking Area identities, etc.

The steps 304 and 402 may be implemented by transmitting the at least one message directly from the UE 100 to the UE 200. Alternatively or in addition, at least some of the at least one message may be transmitted from the UE 100 to the UE 200 via one or more other UEs (e.g., further embodiments of the UE 200), e.g. to all other UEs 200 involved in the concerned SL communications 502. For example, the at least one message may be propagated to all UEs 200, in the case of group SL communications 502, which are in the group and/or in the communication range of the UE 100 sending the SL radio configuration (e.g., the UE1).

In an implementation of the second aspect, which is combinable with any aforementioned aspect, embodiment or implementation, the UE 200 receives the SL radio configuration from UE 100 according to the step 402. If at least one of the above conditions are fulfilled (i.e., if the negative conditions are not fulfilled, e.g., if the geographical limitation is fulfilled by the position of the UE 200), the UE 200 uses (i.e., applies) according to the step 404 the SL radio configuration received in the step 402. For example, the UE 200 configures its physical (PHY) layer, medium access control (MAC) layer, radio link control (RLC) layer and/or packet data convergence protocol (PDCP) layer with the radio resources and/or transmission parameters indicated in the at least one message, e.g., according to the received SL radio configuration.

Optionally, e.g., in any aspect, embodiment or implementation, the UE 200 notifies the UE 100, and possibly all the other UEs 100 or 200 involved in the same SL communications 502 (e.g. using a SL groupcast and/or broadcast signal) that the SL radio configuration has been either discarded or is used (i.e., has been successfully acquired). This notification may be provided via RRC signaling or via a MAC control element (CE). For example, the notification may be indicative of whether the SL radio configuration has been acknowledged or not.

In one variant, the UE 100 may assume that the SL radio configuration has been discarded if no acknowledgment has been received from the UE 200 within a certain period of time (e.g., X seconds) from when the UE 100 has transmitted the at least one message indicative of the SL radio configuration. In another variant, the UE 100 may assume that the SL radio configuration has been successfully acquired unless an indication of the opposite has been received.

In absence of an acknowledgment feedback from UE 200 or in case of an indication that the resources have been discarded or not applied, the UE 100 may be adapted to indicate to the base station (e.g., its serving base station or the gNB A in FIGS. 6 and 7) and/or to higher layers (e.g., layers performing an application or service associated with the SL communications 502) that the UE 200 has not received and/or not applied the SL radio configuration. Alternatively or in addition, the UE 100 may be adapted to indicate to the base station and/or to higher layers that the UE 200 has successfully received and configured the SL radio configuration.

The transmission of the notification from the UE 200 to the UE 100 may be implemented as a direct radio transmission or the notification may be transmitted via one or more other UEs (e.g., further embodiments of the UE 100 or 200).

Optionally, e.g., in any aspect, embodiment or implementation, upon discarding or missing the SL radio configuration from the UE 100 according to the step 404, the UE2 performs at least one of the following discarding operations.

In a first discarding operation, the UE 200 uses an exceptional radio configuration (e.g., comprising exceptional radio resources) for the concerned SL communications 502, which are valid in the cell 604, Tracking Area, PLMN and/or geographical area 602 in which the UE 200 is located. The exceptional radio configuration may be configured by one of the one or more base stations 504 (e.g., the gNB A or B in the FIGS. 6 and 7) or may be preconfigured in the local memory of the UE 200. The exceptional radio configuration may be used also by other UEs 100 or 200 involved in SL communications 706 different from the SL communications 502 in which the UE 200 is involved. The exceptional radio configuration can be specific for a given casting-type, e.g. unicast transmission, groupcast transmission or broadcast transmission.

In a second discarding operation, if the UE 200 is in a connected mode, the UE2 may request to the corresponding base station 704 (e.g., the gNB C in FIG. 7) the SL radio configuration for the specific SL communications, e.g., responsive to an invalid SL radio configuration received from the UE 100. For example, the UE 200 may indicate that the specific SL communications 502 in which the UE 200 is involved is for broadcast communication, unicast communication or groupcast communication. Alternatively or in addition, the UE 200 may indicate to corresponding base station 704 an ID of the unicast link, broadcast link or groupcast link (e.g. the group ID or SL communications session ID). Optionally, the UE 200 forwards to the corresponding base station 704 all or a part of the SL radio configuration received from the UE 100 in the step 402.

In a third discarding operation, the UE 200 may determine whether or not the QoS requirements for the SL communications 502 are not satisfactory, e.g., after using the exceptional radio configuration. For example, the UE 200 may use the exceptional radio configuration and at the same time monitor performances of the SL communication 502, such as the packet delay budget, data rate, packet error rate, etc., over a time window. The UE 200 may for example monitor if the percentage of SL transmissions which do not fulfill the QoS requirements is above a certain threshold within a time window. If that occurs, the UE 200 may send to the base station 704 (e.g., the gNB C in FIG. 7) a request for SL radio configuration for the specific SL communication.

In a fourth discarding operation, the UE 200 may initiate a SL radio configuration request over the SL, e.g. using PC5 RRC signaling, to request SL radio configuration to other UEs. One or more UEs 100 involved in the same SL communication and which are capable of providing SL radio configuration may reply with a SL radio configuration according to the first aspect. For example, if the UE 200 is in an idle mode (e.g., an RRC_IDLE mode), the UE 200 may enter a connected mode (e.g., an RRC_CONNECTED mode) and transmit a SL radio configuration request.

In a fifth discarding operation, the UE 200 may release the SL connection for the SL communications 502, e.g., by releasing any SL bearer of the SL communications 502 and/or clearing PDCP functionalities, MAC functionalities and/or RLC functionalities associated with the SL communications 502. Alternatively or in addition, the UE 200 may discard any SL radio configuration received from UE 100 in a previous point in time. Alternatively or in addition, the UE 200 may indicate to higher layers (e.g., an application layer) of its local protocol stack and/or to an application function in a cloud node (e.g. a V2X server) that the concerned SL has been released and/or that UE 200 has left the SL communications 502.

In a sixth discarding operation, the UE 200 (e.g., the higher layers in the UE 200) and/or the cloud node may initiate a discovery procedure, e.g., in order to establish other SL communications 706 with other UEs in the proximity.

In a seventh discarding operation, the UE 200 (e.g., the higher layers in the UE 200 and/or the cloud node, e.g. upon performing the sixth discarding operation, may appoint the UE 200 or any other UE involved in the other SL communication 706 to perform the method 300 (i.e., the first aspect). In other words, the UE formerly embodying the configured radio device 200 may, responsive to the appointment, embody the reference radio device 100, particularly as a cluster head of the other SL communication 706.

At least some of the above discarding operations may be performed by UE 200 if the SL radio configuration is missing, e.g. if the SL radio configuration is not received by UE 200 from UE 100 within a certain time window. For example, the UE 200 may expect a SL radio configuration signaled by the UE 100 within a certain time window from the point in time in which a SL communications 502 is established between the UE 100 and the UE 200, or in case of group communication, within a certain time window from the point in time in which the UE 200 joined the group in which UE 100 is associated to.

At least some of the above discarding operations may be performed by UE 200 when the validity time of a previously received SL radio configuration is expired, or if no SL radio configuration is received from UE 100 at the point in time in which it was expected (e.g. if the SL radio configuration should be transmitted with a certain periodicity). The letter case may occur, for example, if the SL channel conditions or inter-vehicle distance between UE 100 and UE 200 are such that UE 200 is not anymore in the coverage range of UE 100.

According to a further aspect, which may be combinable with any aspect, embodiment or implementation described herein, a base station 704 (e.g., the gNB C in FIG. 7) or a higher layer node (such as a V2X application function in a cloud node) may perform at least one of the following configuration operations when receiving a SL radio configuration for a specific SL communications 502 or when receiving a request for another SL radio configuration 706, because of an invalid SL radio configuration received from the UE 100.

In a first configuration operation, the base station 704 transmits, to the UE 200, a control information that is indicative of a second SL radio configuration for the concerned SL communication 502.

In a second configuration operation, the base station 704 transmits, to the UE 200, a control information that triggers the UE 200 to provide the SL radio configuration (e.g., the second SL radio configuration) via the SL communications 502 to other UEs involved in the SL communications 502. This operation may depend on whether the UE 200 is capable, e.g., in terms RAN capabilities (e.g. transmitter and receiver chains, supported frequency, etc.) to provide the SL radio configuration in the SL communications 502. For example, the control information triggers the UE 200 to switch from performing the method 400 (i.e., the second aspect) to performing the method 300 (i.e., the first aspect). Optionally, control information further appoints the UE 200 to function as cluster head.

In a third configuration operation, the base station 704 (e.g., the gNB C in FIG. 7) informs a core network node, e.g. an Access Mobility Function (AMF) and/or a Session Management Function (SMF), that there is a UE 200 which is involved in a certain SL communications 502 and does not have a corresponding SL radio configuration. Such indication may contain information related to the specific SL communication 502 in which the UE 200 is involved, e.g. the ID of at least one of the group, the groupcast communications, the unicast communications and the broadcast communications. The core network node may then indicate to the base station 704 the second SL radio configuration that has to be used for the concerned SL communications 502. The second SL radio configuration may be the same or a superset of the (first) SL radio configuration provided by the UE 100 and/or (e.g. indirectly via the UE 100) by the base station 504 (e.g., the gNB A in FIG. 7), i.e. the gNB under which the UE 100 is in coverage.

In a fourth configuration operation, the base station 704 transmits, to the UE 200, a control information that initiates a discovery procedure by the UE 200, e.g., to discover other UEs interested in a given V2X service of interest.

In any aspect, embodiment or implementation, if an embodiment of the UE 200 does not fulfil one or more of the (positive) conditions for using the SL radio configuration (also referred to as the first SL radio configuration) according to the step 404, i.e., if one or more of the (negative) conditions for discarding the first SL radio configuration according to the step 404 are fulfilled, the UE 200 may discard the first SL radio configuration not immediately. Rather, the UE 200 may perform at least one of the discarding operations described above, e.g., to acquire a second SL radio configuration.

Optionally, once the UE 200 has acquired the second SL radio configuration, it may keep both the first SL radio configuration and the second SL radio configuration. In one variant, the UE 200 uses a SL radio configuration which is the union of the first SL radio configuration and the second SL radio configuration. In another variant, assuming that a SL radio configuration comprises both a receiving radio configuration (e.g., receiver radio resources and/or receiver parameters) and transmitting radio configurations (e.g., transmitter radio resources and/or transmitter parameters), such as receiving and transmitting resource pools, the UE 200 uses the union of the first SL radio configuration and the second SL radio configuration to receive and/or decode transmissions. Moreover, the UE 200 may use exclusively the second SL radio configuration to perform transmissions.

Figure 8:
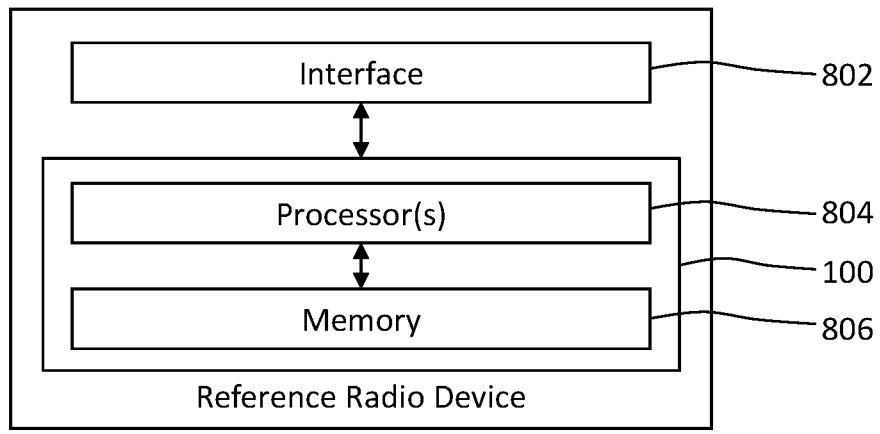
FIG. 8 shows a schematic block diagram of a transmitting station embodying the device of FIG. 1.

FIG. 8 shows a schematic block diagram for an embodiment of the device 100. The device 100 comprises one or more processors 804 for performing the method 300 and memory 806 coupled to the processors 804. For example, the memory 806 may be encoded with instructions that implement at least one of the modules 102 and 104.

The one or more processors 804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 806, configuration-distribution functionality or reference radio device functionality. For example, the one or more processors 804 may execute instructions stored in the memory 806. Such functionality may include providing various features and steps discussed herein, including any of the benefits disclosed herein. The expression "the device being operative to perform an action" may denote the device 100 being configured to perform the action.

As schematically illustrated in FIG. 8, the device 100 may be embodied by a reference radio device 800, e.g., functioning as a UE. The reference radio device 800 comprises a radio interface 802 coupled to the device 100 for radio communication with one or more base stations or UEs.

Figure 9:
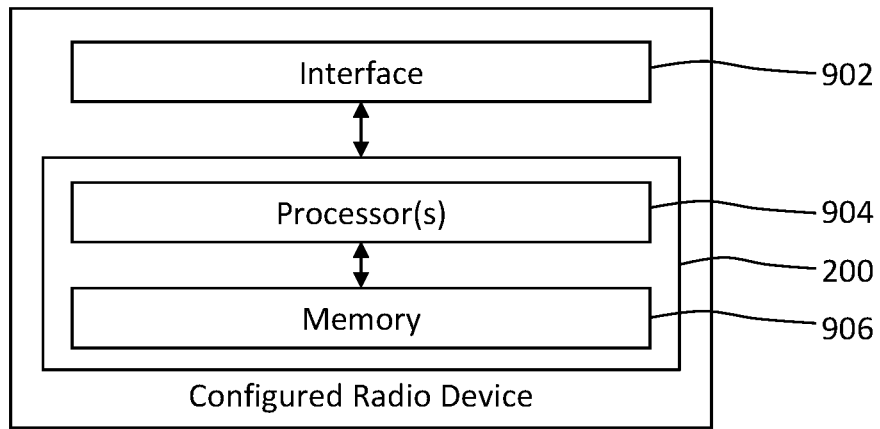
FIG. 9 shows a schematic block diagram of a receiving station embodying the device of FIG. 2.

FIG. 9 shows a schematic block diagram for an embodiment of the device 200. The device 200 comprises one or more processors 904 for performing the method 400 and memory 906 coupled to the processors 904. For example, the memory 906 may be encoded with instructions that implement at least one of the modules 202 and 204.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 906, configuration-receiving functionality or configured radio device functionality. For example, the one or more processors 904 may execute instructions stored in the memory 906. Such functionality may include providing various features and steps discussed herein, including any of the benefits disclosed herein. The expression "the device being operative to perform an action" may denote the device 200 being configured to perform the action.

As schematically illustrated in FIG. 9, the device 200 may be embodied by a configured radio device 900, e.g., functioning as a UE. The configured radio device 900 comprises a radio interface 902 coupled to the device 200 for radio communication with one or more base stations or UEs.

Figure 10:
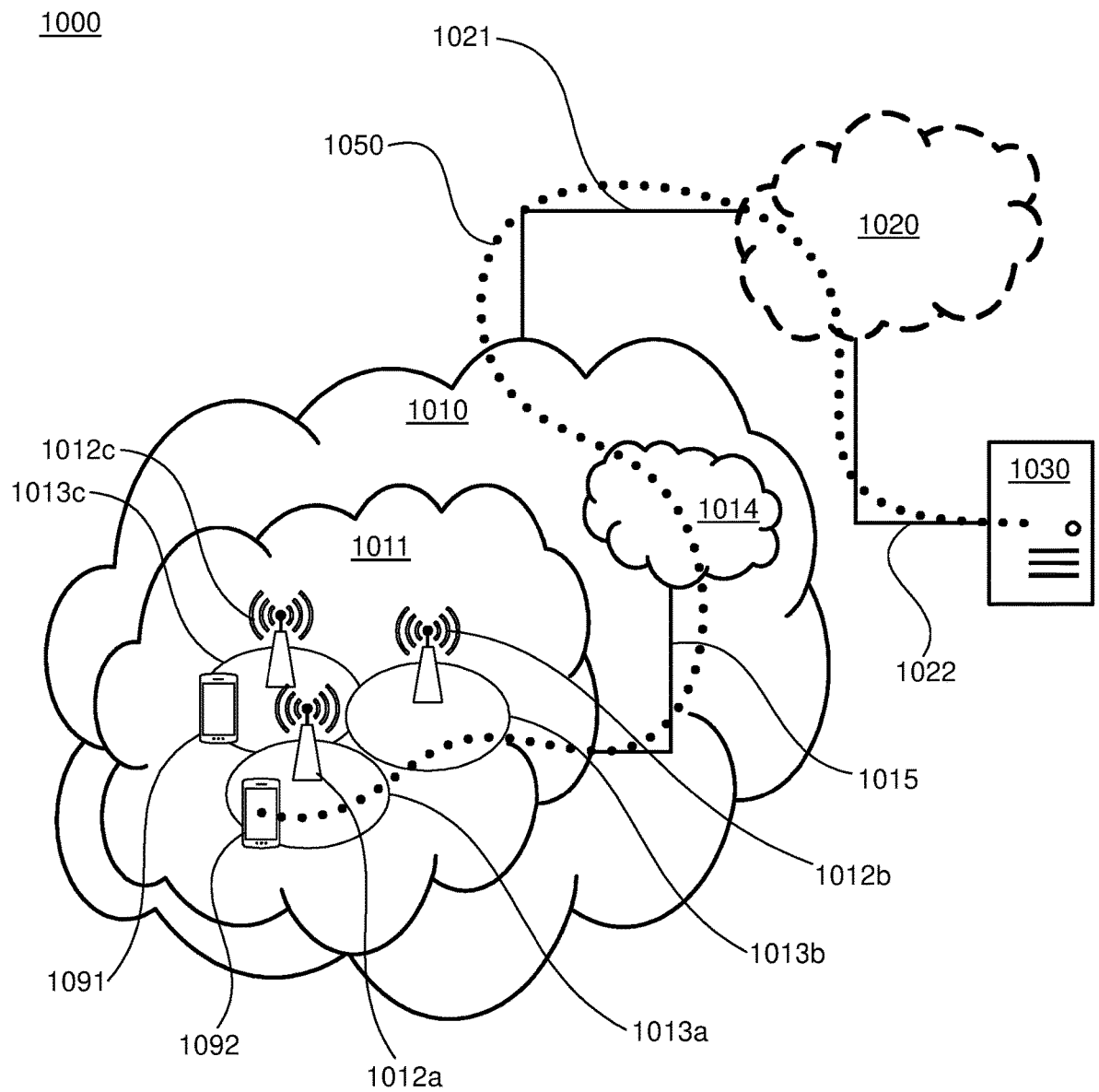
FIG. 10 schematically illustrates an example telecommunication network connected via an intermediate network to a host computer.

With reference to FIG. 10, in accordance with an embodiment, a communication system 1000 includes a telecommunication network 1010, such as a 3GPP-type cellular network, which comprises an access network 1011, such as a radio access network, and a core network 1014. The access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to the core network 1014 over a wired or wireless connection 1015. A first user equipment (UE) 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Any of the UEs 1091, 1092 may embody the reference radio device 100 or the configured radio device 200.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system 1000 of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

By virtue of the methods 300 and/or 400 being performed by at least one of the UEs 1091 and 1092 and/or any one of the base stations 1012, the performance of the OTT connection 1050 can be improved, e.g., in terms of increased throughput and/or reduced latency. More specifically, the host computer 1030 may provide the user data that is transmitted and/or received according to the distributed and/or received radio configuration for the SL communications.

Example implementations, in accordance with an embodiment of the UE, base station and host computer discussed in the preceding paragraphs, will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data, which is transmitted using the OTT connection 1150. The user data may depend on the location of the UE 1130. The user data may comprise auxiliary information or precision advertisements (also: ads) delivered to the UE 1130. The location may be reported by the UE 1130 to the host computer, e.g., using the OTT connection 1150, and/or by the base station 1120, e.g., using a connection 1160.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct, or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

Figure 11:
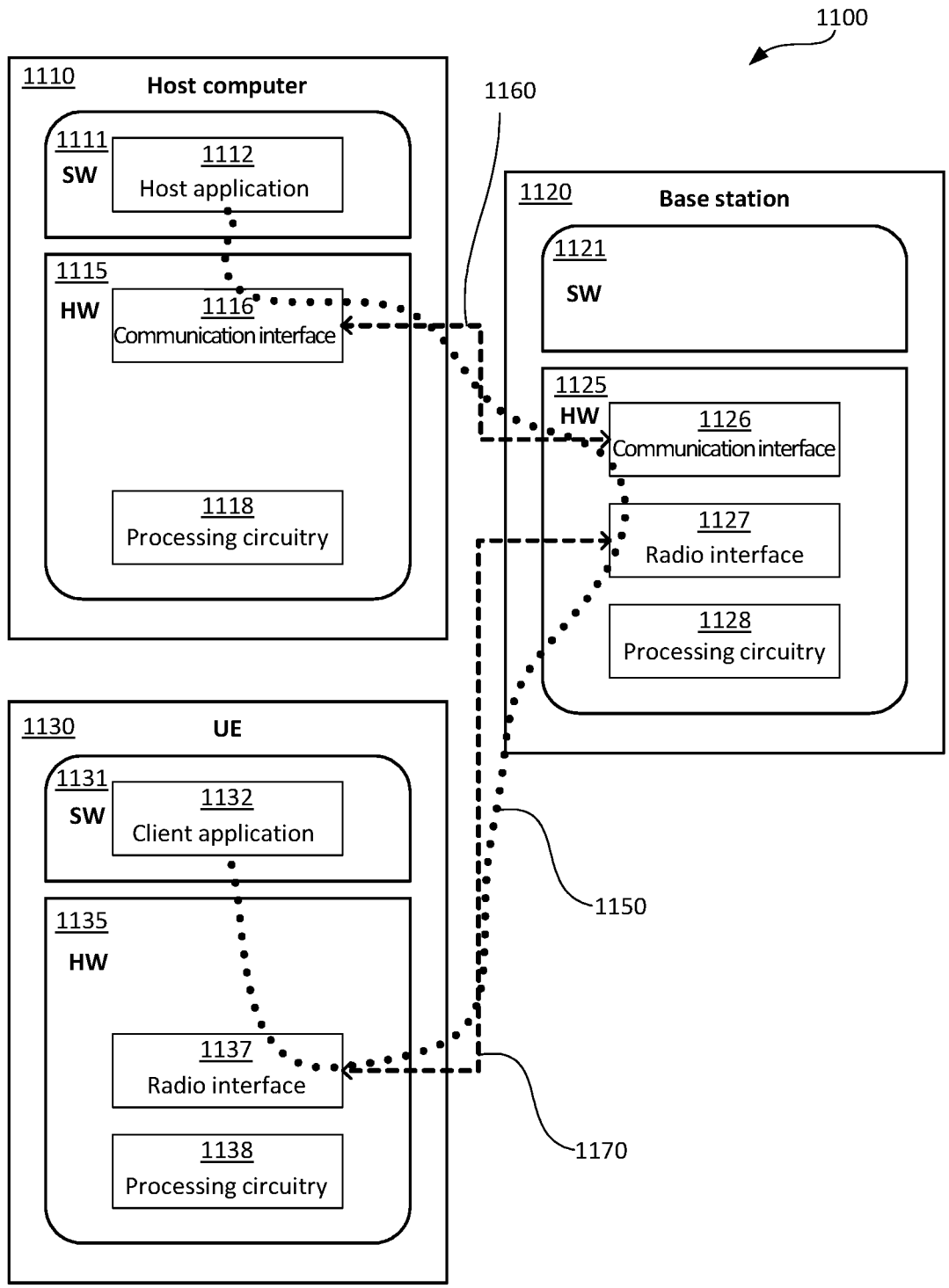
FIG. 11 shows a generalized block diagram of a host computer communicating via a base station or radio device functioning as a gateway with a user equipment over a partially wireless connection.

It is noted that the host computer 1110, base station 1120 and UE 1130 illustrated in FIG. 11 may be identical to the host computer 1030, one of the base stations 1012*a*, 1012*b*, 1012*c* and one of the UEs 1091, 1092 of FIG. 10, respectively. This is to say, the inner workings of these entities may be as shown in FIG. 11, and, independently, the surrounding network topology may be that of FIG. 10.

In FIG. 11, the OTT connection 1150 has been drawn abstractly to illustrate the communication between the host computer 1110 and the UE 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1110 measurements of throughput, propagation times, latency and the like. The measurements may be implemented in that the software 1111, 1131 causes messages to be transmitted, in particular empty or "dummy" messages, using the OTT connection 1150 while it monitors propagation times, errors etc.

Figures 12, 13:
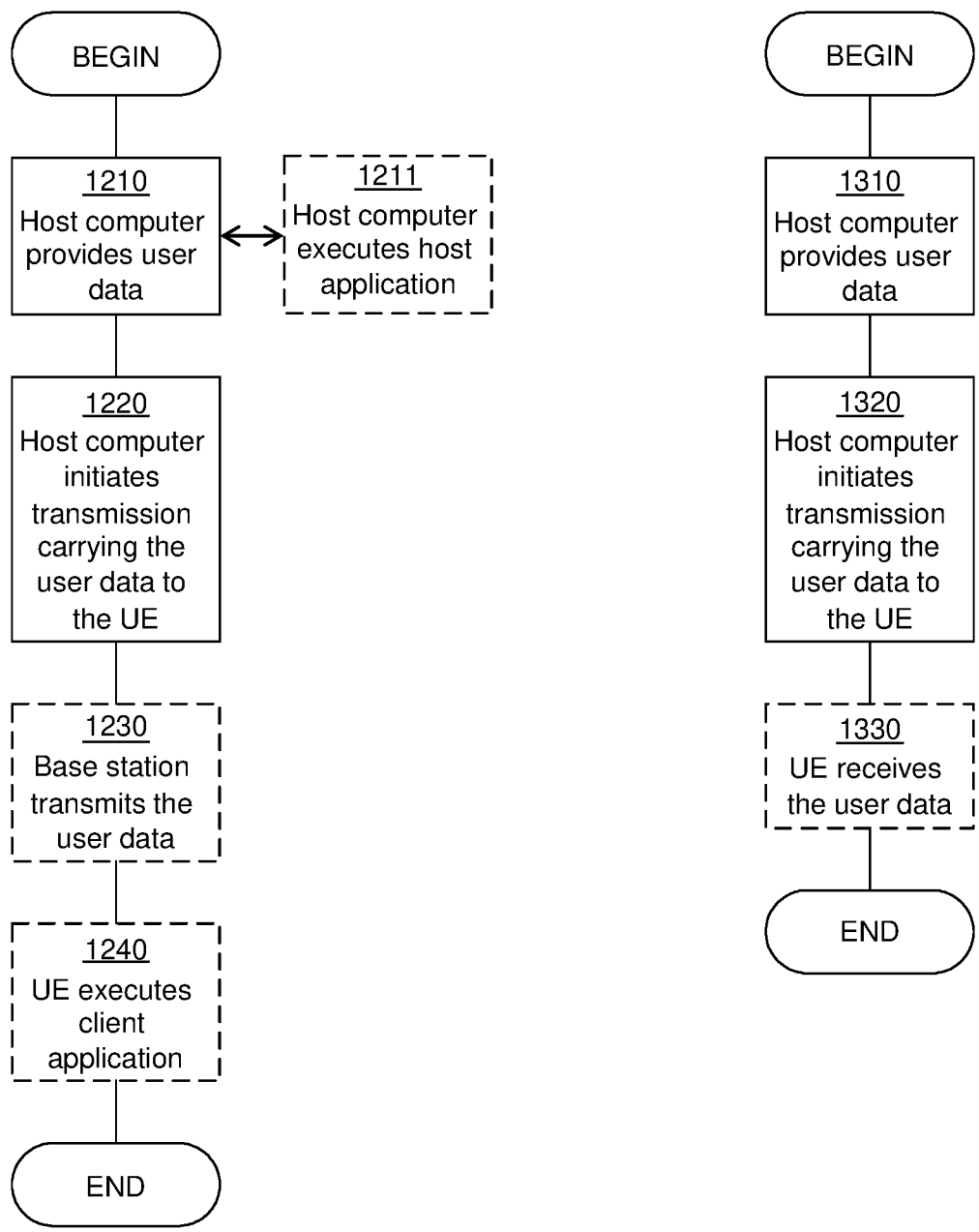
FIGS. 12 and 13 show flowcharts for methods implemented in a communication system including a host computer, a base station or radio device functioning as a gateway and a user equipment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this paragraph. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this paragraph. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

As has become apparent from above description, embodiments of the technique allow at one time to reduce SL interference across neighboring areas, thereby limiting the impact on SL performances when different radio devices (e.g., UEs) involved in the same SL communications (e.g., the same SL communications session) are covering an area spanning more than one cells and/or more than one geographical area. The SL communications may comprise unicast, groupcast, and/or broadcast transmissions.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention may be limited (e.g., only) by the scope of the following claims.

Any one of the claimed embodiments may be realized independently or in combination with any one of the aforementioned embodiments.

The invention claimed is:

1. A method of distributing a radio configuration for sidelink (SL) communications that extend beyond an area covered by one or more base stations, the method comprising:
    receiving the radio configuration comprising radio resources for the SL communications from at least one of the one or more base stations and local memory;
    transmitting at least one message in the SL communications, which is indicative of at least a subset of the radio configuration and a geographical and/or temporal limitation thereof; and
    the transmitting further comprising at least two messages each being indicative of a different one of disjoint subsets of the received radio resources as well as a different one of disjoint geographical and/or temporal limitations that limit a usage of the respective subsets of the radio resources.

2. The method of claim 1, wherein the geographical limitation extends beyond the area covered by the one or more base stations or corresponding cells.

3. The method of claim 1, wherein the area covered by the one or more base stations or corresponding cells is within the geographical limitation.

4. The method of claim 1, wherein the SL communications extend beyond the geographical limitation.

5. The method of claim 1, wherein the received radio configuration and/or the at least one message is further indicative of the temporal limitation for at least the subset of the radio configuration.

6. The method of claim 1, wherein the at least one message is indicative of the geographical and/or temporal limitation that limits a usage of at least the subset of the radio resources for the SL communications.

7. The method of claim 1, wherein the at least one message is transmitted using a radio interface of the SL communications.

8. The method of claim 1, wherein the SL communications comprise a unicast session, a groupcast session, and/or a broadcast session.

9. The method of claim 8, wherein the method is performed by a reference radio device that participates in the SL communications.

10. The method of claim 1, wherein the transmission of the at least one message is a unicast transmission, a groupcast transmission, and/or broadcast transmission.

11. The method of claim 1, wherein the at least one message is transmitted using radio resource control (RRC) signaling of the SL communications.

12. The method of claim 1:
    wherein the received radio configuration comprises transmission parameters; and
    wherein the at least one message is indicative of at least a subset of the transmission parameters for the SL communications.

13. The method of claim 1, wherein the received radio configuration comprises the geographical and/or temporal limitation.

14. A method of receiving a radio configuration for sidelink (SL) communications that extend beyond an area covered by one or more base stations, the method comprising:
    receiving, from at least one message in the SL communications or local memory, at least a subset of the radio configuration comprising radio resources and a geographical and/or temporal limitation thereof;
    the transmitting further comprising at least two messages each being indicative of a different one of disjoint subsets of the received radio resources as well as a different one of disjoint geographical and/or temporal limitations that limit a usage of the respective subsets of the radio resources; and
    using the radio configuration for the SL communications if the geographical and/or temporal limitation is fulfilled.

15. The method of claim 14, further comprising transmitting a feedback signal in the SL communications, the feedback signal being indicative of whether the radio configuration for the SL communications has been used or discarded.

16. The method of claim 14, wherein another radio configuration for the SL communications is requested from one of the one or more base stations if the received radio configuration is discarded or if a quality of service (QOS) requirement is not fulfilled in the SL communications using the received radio configuration.

17. A device for distributing a radio configuration for sidelink (SL) communications that extend beyond an area covered by one or more base stations, the device comprising:
    processing circuitry;
    memory containing instructions executable by the processing circuitry whereby the device is operative to:

receive the radio configuration comprising radio resources for the SL communications from at least one of the one or more base stations and local memory; and transmit at least one message in the SL communications, which is indicative of at least a subset of the radio configuration and a geographical limitation thereof;

the transmitting further comprising at least two messages each being indicative of a different one of disjoint subsets of the received radio resources as well as a different one of disjoint geographical and/or temporal limitations that limit a usage of the respective subsets of the radio resources.

18. A device for receiving a radio configuration for sidelink (SL) communications that extend beyond an area covered by one or more base stations, the device comprising:

processing circuitry;

memory containing instructions executable by the processing circuitry whereby the device is operative to:

receive, from at least one message in the SL communications or local memory, radio configuration comprising radio resources and at least a subset of the radio configuration and a geographical limitation thereof;

the transmitting further comprising at least two messages each being indicative of a different one of disjoint subsets of the received radio resources as well as a different one of disjoint geographical and/or temporal limitations that limit a usage of the respective subsets of the radio resources; and use the radio configuration for the SL communications if the geographical limitation is fulfilled or discard the radio configuration for the SL communications if the geographical limitation is not fulfilled.

* * * * *